US010277766B2

(12) United States Patent
Yamada et al.

(10) Patent No.: US 10,277,766 B2
(45) Date of Patent: Apr. 30, 2019

(54) IMAGE FORMING APPARATUS, TERMINAL DEVICE, DATA PROVIDING METHOD, AND COMPUTER PROGRAM

(71) Applicant: KONICA MINOLTA, INC., Chiyoda-ku, Tokyo (JP)

(72) Inventors: Masami Yamada, Osaka (JP); Atsushi Ohshima, Amagasaki (JP); Takeshi Maekawa, Osaka (JP); Kenichi Takahashi, Osaka (JP); Masaya Hashimoto, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/188,744

(22) Filed: Jun. 21, 2016

(65) Prior Publication Data

US 2017/0006178 A1 Jan. 5, 2017

(30) Foreign Application Priority Data

Jun. 30, 2015 (JP) .................................. 2015-131465

(51) Int. Cl.
*H04N 1/00* (2006.01)
*H04L 29/06* (2006.01)
(Continued)

(52) U.S. Cl.
CPC ....... *H04N 1/00944* (2013.01); *H04B 5/0031* (2013.01); *H04L 63/10* (2013.01);
(Continued)

(58) Field of Classification Search
None
See application file for complete search history.

(56) References Cited

U.S. PATENT DOCUMENTS

| 9,087,208 B2 | 7/2015 | Ibel et al. |
| 10,043,025 B2 | 8/2018 | Ibel et al. |

(Continued)

FOREIGN PATENT DOCUMENTS

| CN | 103620602 A | 3/2014 |
| JP | 2010161780 A | 7/2010 |

(Continued)

OTHER PUBLICATIONS

JP 2011-182449 machine translation.*
(Continued)

*Primary Examiner* — Lennin R Rodriguezgonzalez
(74) *Attorney, Agent, or Firm* — Holtz, Holtz & Volek PC

(57) ABSTRACT

An image forming apparatus includes: a first communication unit configured to perform communication by a short-distance wireless method; a second communication unit having a broader communication range than the first communication unit; a storage unit configured to store data to which an access right of a first user is set; a connection information providing unit configured to, when a data providing command for providing the data from a first terminal device of the first user to another user is received, and an access request to the data is received from a second terminal device of a second user, transmit connection information for accessing the data to the second terminal device; and a data providing unit configured to transmit the data to the second terminal device by the second communication unit, when a transmission request of the data is received from the second terminal device based on the connection information.

11 Claims, 29 Drawing Sheets

(51) Int. Cl.
  *H04B 5/00* (2006.01)
  *H04N 1/327* (2006.01)
(52) U.S. Cl.
  CPC ......... *H04L 63/20* (2013.01); *H04N 1/00307* (2013.01); *H04N 1/32771* (2013.01); *H04N 2201/0094* (2013.01)

(56) References Cited

U.S. PATENT DOCUMENTS

| | | |
|---|---|---|
| 2012/0331529 A1 | 12/2012 | Ibel et al. |
| 2014/0213190 A1 | 7/2014 | Yamaoka |
| 2015/0286838 A1 | 10/2015 | Ibel et al. |

FOREIGN PATENT DOCUMENTS

| | | |
|---|---|---|
| JP | 2011182449 A | 9/2011 |
| JP | 2013158061 A | 8/2013 |
| JP | 2014149666 A | 8/2014 |

OTHER PUBLICATIONS

JP 2010-161780 machine translation.*
Japanese Office Action (and English translation thereof) dated Jun. 13, 2017, issued in counterpart Japanese Application No. 2015-131465.
Chinese Office Action (and English language translation thereof) dated Jul. 3, 2018 issued in Chinese Application No. 1201610499307.

* cited by examiner

IMAGE FORMING APPARATUS, TERMINAL DEVICE, DATA PROVIDING METHOD, AND COMPUTER PROGRAM

The entire disclosure of Japanese Patent Application No. 2015-131465 filed on Jun. 30, 2015 including description, claims, drawings, and abstract are incorporated herein by reference in its entirety.

BACKGROUND OF THE INVENTION

Field of the Invention

The present invention relates to a technology for providing data from an image forming apparatus to other devices.

Description of the Related Art

In recent years, image forming apparatuses in which copy, network print, facsimile, scan, and box functions are put together have been spread. Such multi-functional image forming apparatuses may be called "multi-function devices" or "multi-function peripherals (MFP)".

The box function is a function to provide a storage area called "box" or "personal box" to each user, and to store and manage data in the own storage area by the each user.

By setting an access right to a certain box only to a specific user, other persons' unauthorized access to the data stored in the box can be prevented.

Further, in recent years, a method for exchanging image data by short-distance wireless communication between two devices has been proposed. The "short-distance wireless communication" is wireless communication with a radio wave having a short reach distance (that is about several centimeters to several meters). An example of a short-distance wireless communication method includes near field communication (NFC). The NFC has various standards. By setting the reach range of the radio wave to be short, to devices that conform to a standard such as Bluetooth (registered trademark) or wireless universal serial bus (USB), the short-distance wireless communication may be realized.

According to the method described in JP 2014-149666 A, in the NFC method, an MFP that has received a connection request from a mobile device transmits NG (no good) if the connection by a WFD method is not allowed. The mobile device selects and transmits alternative server information to the MFP. The MFP transmits OK if determining that the MFP is connectable to the alternative server. The mobile device uploads a print job to the alternative server, and transmits a URL that indicates the print job to the MFP. The MFP that has received the URL downloads the print job based on the URL, and executes printing according to the downloaded print job.

An image forming apparatus described in JP 2013-158061 A includes a wireless communication unit that receives data from a mobile telephone, and a reader/writer that transmits an address of the wireless communication unit to the mobile telephone. The mobile telephone includes a contact/non-contact IC card that receives the address, and a wireless communication unit that transmits image data to the wireless communication unit using the address. In communication between the mobile telephone and the image forming apparatus, the address of the wireless communication unit is transmitted to the contact/non-contact IC card through the reader/writer, and the wireless communication unit transmits the data to the wireless communication unit using the address.

Further, exchange of data between the image forming apparatus and a terminal device by the short-distance wireless communication with simple operations of a user has been devised. For example, after the user specifies processing for the terminal device, the user simply brings the terminal device close to or into contact with a predetermined position of the image forming apparatus, so that communication for the processing is performed between the terminal device and the image forming apparatus.

By use of this technology, the user only performs a simple operation when downloading data stored in a box from the image forming apparatus to the terminal device.

However, when an access right to the box is not provided to the user, the user cannot download the data. In this case, a manager or an owner of the box needs to provide the access right to the user. After the user acquires the data, the manager or the owner needs to delete the access right to the user. Work by the manager or the owner is burdensome.

Alternatively, another user who has the access right acquires the data from the box, and needs to provide the data to the user through a communication line or a portable recording medium (for example, a USB memory). Work by this method is also burdensome. In the case through the portable recording medium, there is a risk of infection of a computer virus and thus is not so popular in terms of security.

SUMMARY OF THE INVENTION

An object of the present invention is, in view of the foregoing, to more easily perform processing for providing data from an image forming apparatus to a terminal device of a user who does not have an access right, than a conventional case, while constantly holding security.

To achieve the abovementioned object, according to an aspect, an image forming apparatus reflecting one aspect of the present invention comprises: a first communication unit configured to perform communication by a short-distance wireless method; a second communication unit having a broader communication range than the first communication unit; a storage unit configured to store data to which an access right of a first user is set; a connection information providing unit configured to, when a data providing command for providing the data from a first terminal device of the first user to another user is received by the first communication unit, and an access request to the data is received through the first communication unit from a second terminal device of a second user, transmit connection information for accessing the data to the second terminal device; and a data providing unit configured to transmit the data to the second terminal device by the second communication unit, when a transmission request of the data is received through the first communication unit from the second terminal device based on the connection information. The first communication unit preferably performs communication by a proximity wireless communication method.

Further, the connection information providing unit preferably controls the first communication unit so that the connection information is transmitted, when the access request is received after the data providing command is received.

Further, the connection information providing unit preferably controls the first communication unit so that the connection information is transmitted, when the access request is received before expiration of a time limit, after the data providing command is received.

Further, the connection information providing unit preferably controls the first communication unit so that the connection information is transmitted, when the access request is received by the time a reception termination command is received by the first communication unit from the first terminal device, after the data providing command is received.

Further, a plurality of the data is preferably stored in the storage unit, and the data providing unit preferably controls the second communication unit so that the data indicated in specification information received by the first communication unit from the first terminal device is transmitted to the second terminal device.

To achieve the abovementioned object, according to an aspect, an image forming apparatus reflecting one aspect of the present invention comprises: a communication unit configured to perform communication by a short-distance wireless method; a storage unit configured to store data to which an access right of a first user is set; and a data providing unit configured to, when a transmission request of the data is received through the communication unit from a second terminal device of a second user, after a data providing command for providing the data from a first terminal device of the first user to another user is received by the communication unit, transmit the data by the communication unit to the second terminal device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
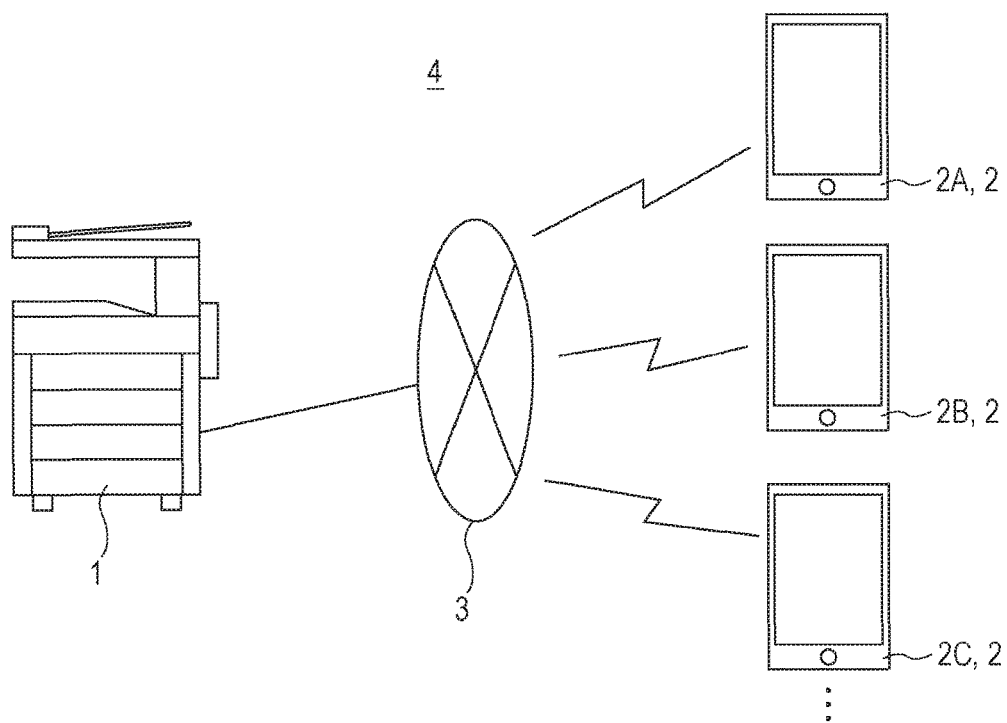
FIG. 1 is a diagram illustrating an example of an overall configuration of a data sharing system.
Figure 2:
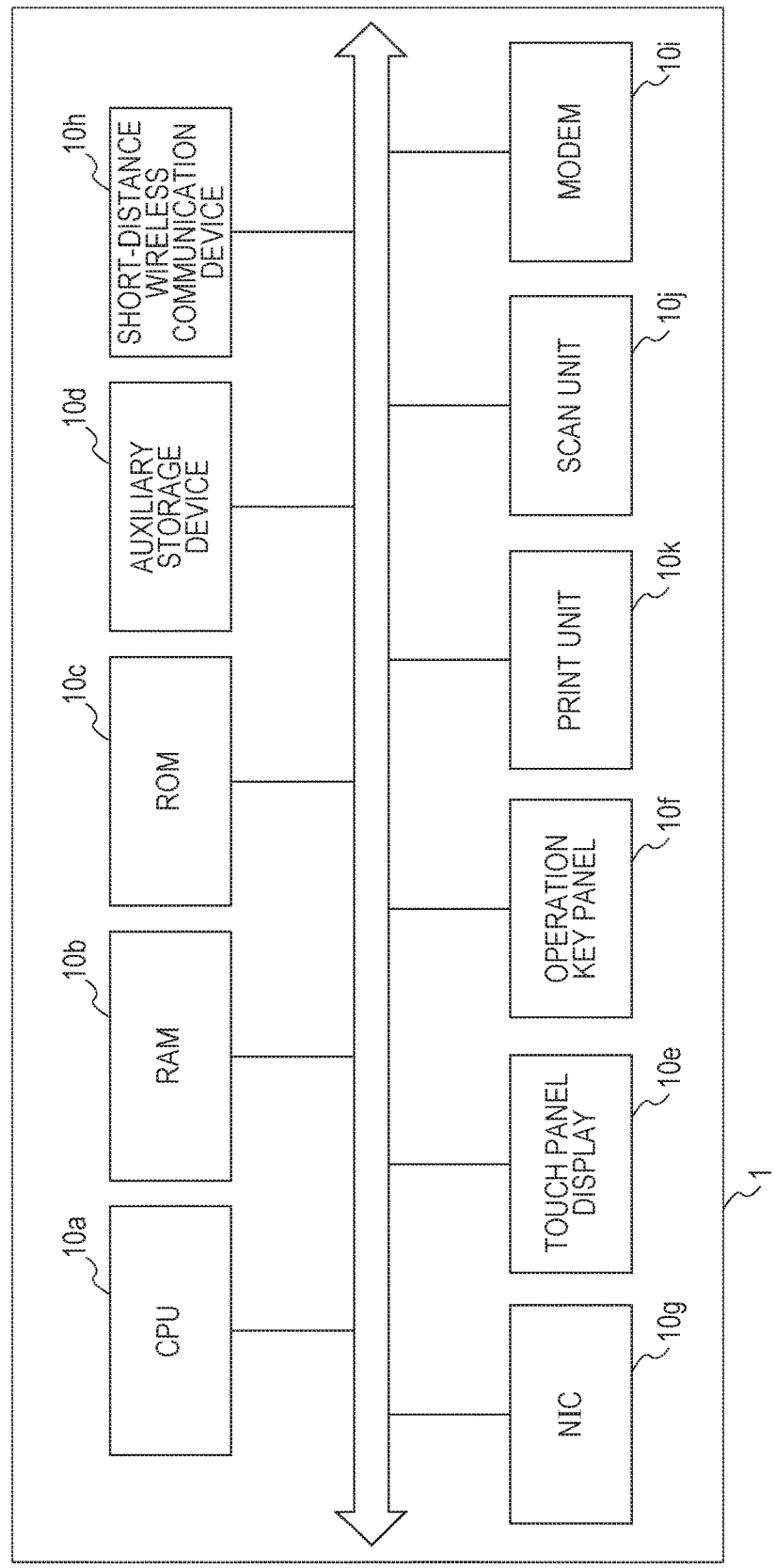
FIG. 2 is a diagram illustrating an example of a hardware configuration of an image forming apparatus.
Figure 3:
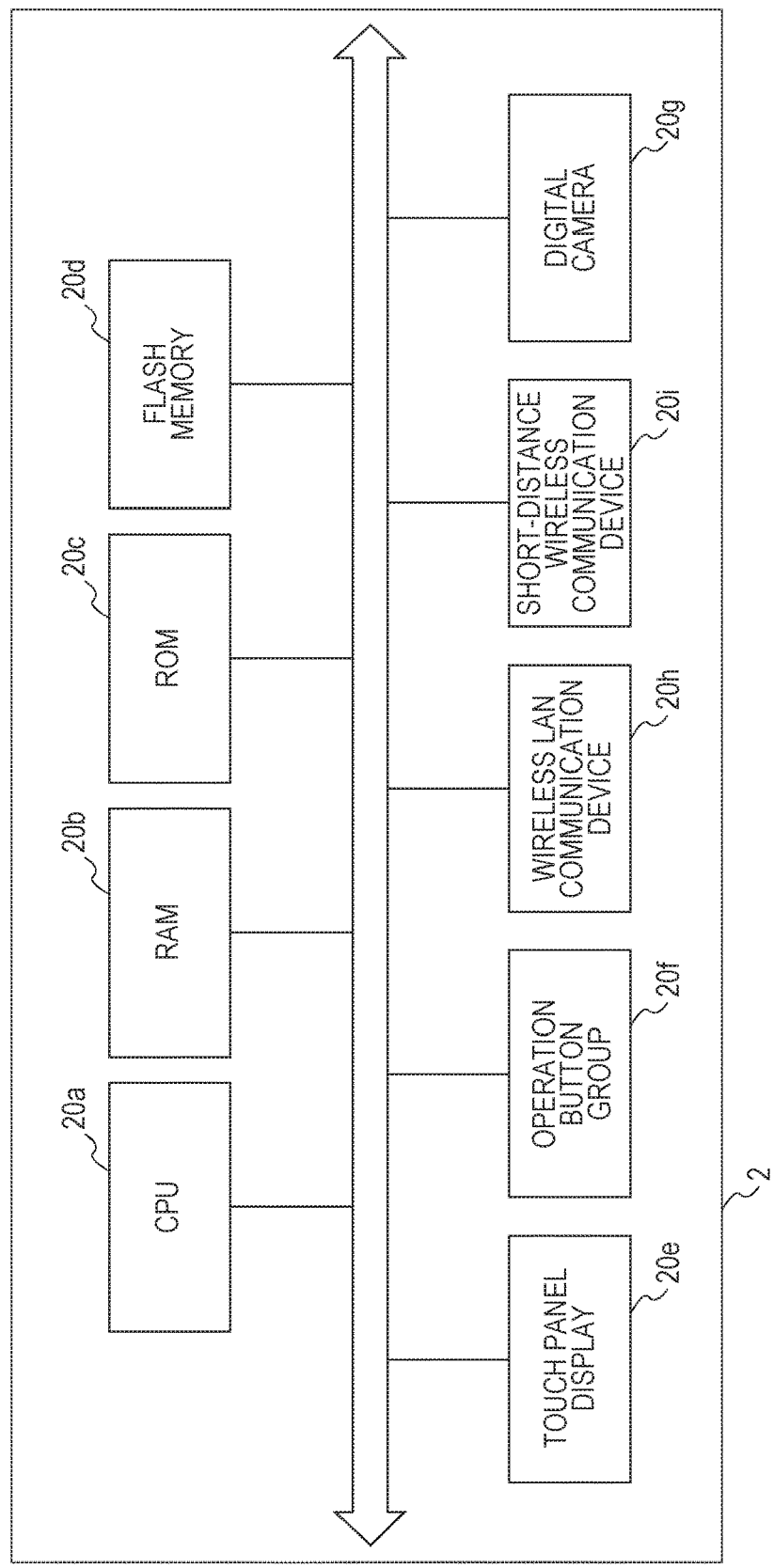
FIG. 3 is a diagram illustrating an example of a hardware configuration of a terminal device.
Figure 4:
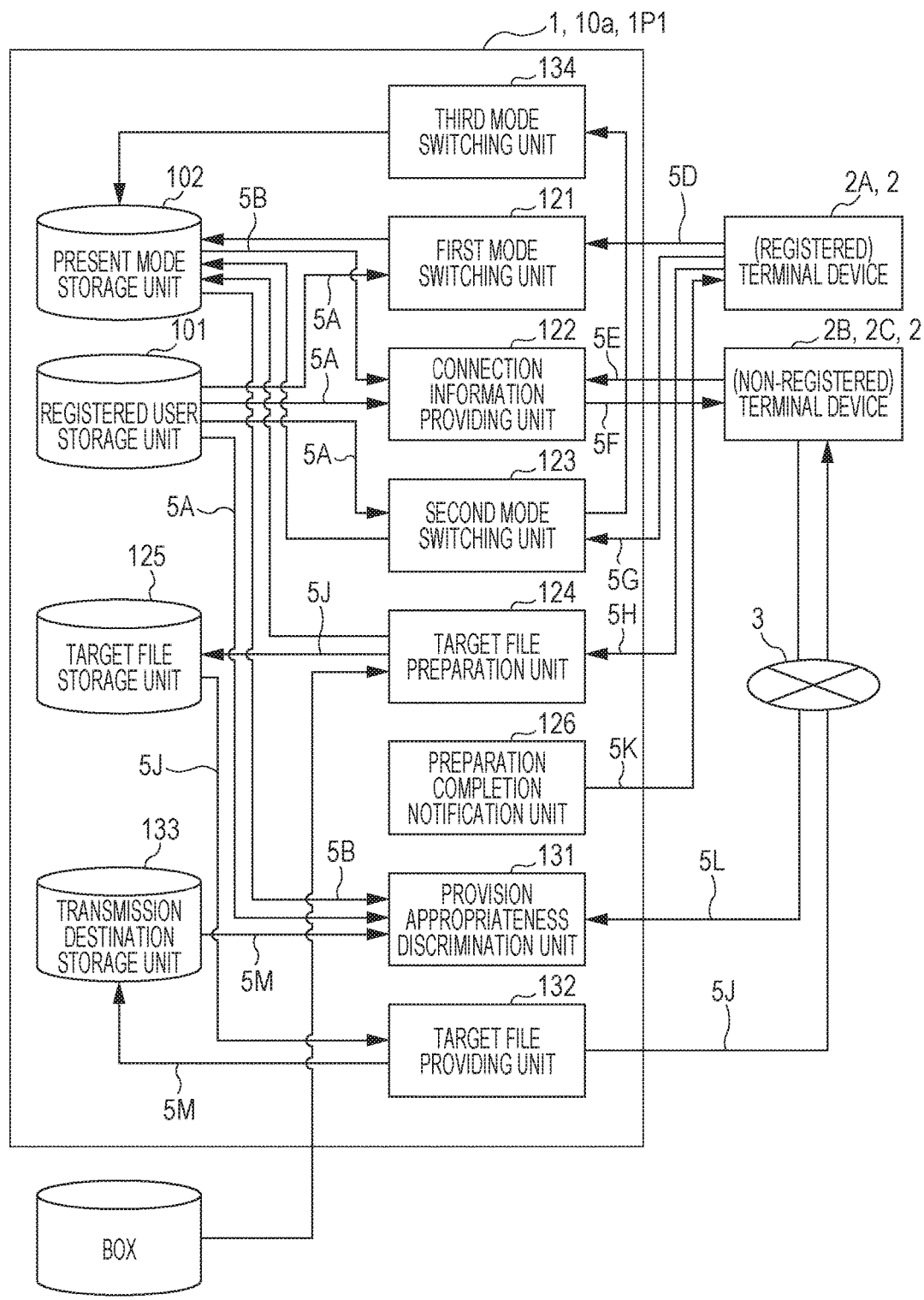
FIG. 4 is a diagram illustrating an example of a functional configuration of the image forming apparatus.
Figure 5:
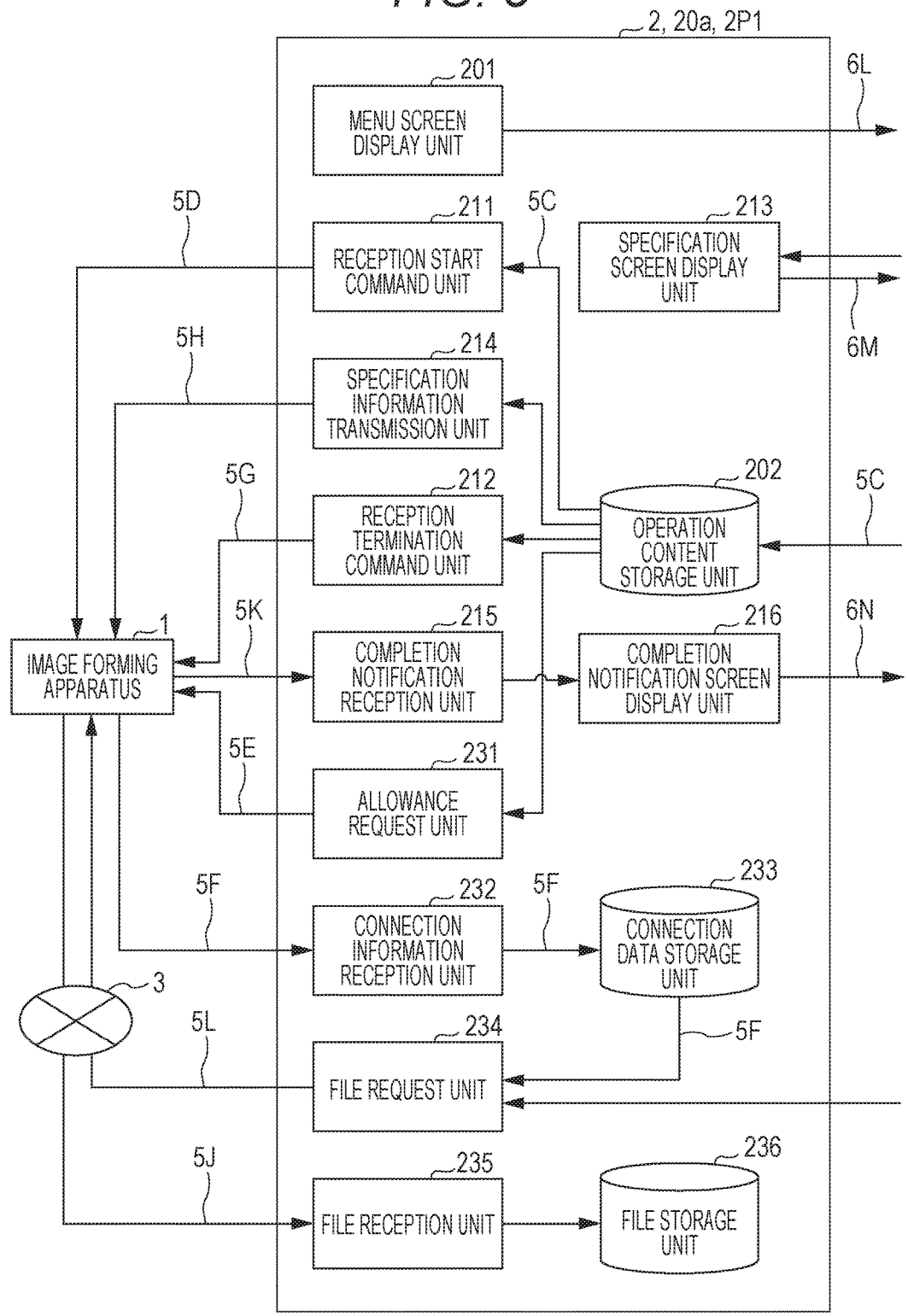
FIG. 5 is a diagram illustrating an example of a functional configuration of the terminal device.

FIG. 1 is a diagram illustrating an example of an overall configuration of a data sharing system 4. FIG. 2 is a diagram illustrating an example of a hardware configuration of an image forming apparatus 1. FIG. 3 is a diagram illustrating an example of a hardware configuration of a terminal device 2. FIG. 4 is a diagram illustrating an example of a functional configuration of the image forming apparatus 1. FIG. 5 is a diagram illustrating an example of a functional configuration of the terminal device 2.

As illustrated in FIG. 1, the data sharing system 4 is configured from the image forming apparatus 1, a plurality of the terminal devices 2, a communication line 3, and the like.

The image forming apparatus 1 and the terminal devices 2 can perform communication through the communication line 3. As the communication line 3, the Internet, a local area network (LAN) line, a mobile phone line, or the like is used.

The image forming apparatus 1 is an apparatus in which copy, network print, facsimile, scan, and box functions are put together. Typically, the image forming apparatus is called "multi-function device", "multi-function peripherals (MFP)", or the like.

The network print function is a function to receive image data from the terminal device 2 and to print an image on a sheet.

The box function is a function to provide a storage area called "box", "personal box", or the like to each user, and to manage data in the own storage area by the each user. The image forming apparatus 1 manages data in units of file. The image forming apparatus 1 can store a plurality of files in the box. The box corresponds to a "folder" or a "directory" in a personal computer.

Further, in the image forming apparatus 1, a function to temporarily provide a file stored in the box of a certain user to another user is provided. Hereinafter, this function is written as "file temporarily providing function".

The terminal device 2 is a client for remotely using the above-described functions of the image forming apparatus 1. As the terminal device 2, a portable device having both of a short-distance wireless communication function and an internet protocol (so-called IP) function is used. Hereinafter, an example in which a smart phone or a tablet computer is used as the terminal device 2 will be described.

As illustrated in FIG. 2, the image forming apparatus 1 is configured from a central processing unit (CPU) 10a, a random access memory (RAM) 10b, a read only memory (ROM) 10c, an auxiliary storage device 10d, a touch panel display 10e, an operation key panel 10f, a network interface card (NIC) 10g, a short-distance wireless communication device 10h, a modem 10i, a scan unit 10j, a print unit 10k, and the like.

The touch panel display 10e displays a screen that displays a message to the user, a screen for prompting the user to input a command or information, a screen that displays a result of processing executed by the CPU 10a, and the like. Further, the touch panel display 10e sends a signal that indicates a touched position to the CPU 10a.

Further, the touch panel display 10e includes a proximity sensor. The proximity sensor detects approach of an object. Usually, the proximity sensor is mainly used in a sleep mode to cancel the sleep mode when a hand of the user has approached. In the present embodiment, the proximity sensor is used to provide data stored in the box. This will be described below.

The operation key panel 10f is a so-called hardware keyboard, and is configured from numeric keys, a start key, a stop key, function keys, and the like.

The NIC 10g performs communication with the terminal devices 2 according to a protocol such as transmission control protocol/internet protocol (TCP/IP) or the like.

The short-distance wireless communication device 10h performs communication with a radio wave of about several centimeters to several meters. A shorter distance to reach by the radio wave is more favorable. Therefore, as the short-distance wireless communication device 10h, use of a device conforming to a near field communication (NFC) standard is favorable. Alternatively, a device conforming to a standard such as Bluetooth or wireless universal serial bus (USB) may be used by setting a reach range of the radio wave to be short. The device conforming to the NFC standard may be provided with a proximity sensor. In this case, it is favorable to use the proximity sensor of the device conforming to the NFC standard, in place of the proximity sensor of the touch panel display 10e.

The modem 10i exchanges image data with a facsimile terminal according to a protocol such as G3.

The scan unit 10j reads an image made on the sheet set on a platen glass, and generates image data.

The print unit 10k prints, on a sheet, the image read by the scan unit 10j, and an image received from the terminal device 2 or the like with the NIC 10g, the short-distance wireless communication device 10h, or the modem 10i.

In the ROM 10c or the auxiliary storage device 10d, programs for realizing the above-described copy function and the like are stored. Especially, as a program for realizing a file temporarily providing function, a server program 1P1 is stored. Processing by the server program 1P1 will be described below with reference to FIG. 4 and the like.

These programs are loaded on the RAM 10b as needed, and are executed by the CPU 10a. As the auxiliary storage device 10d, a hard disk, a solid state drive (SSD), or the like is used.

As illustrated in FIG. 3, the terminal device 2 is configured from a CPU 20a, a RAM 20b, a ROM 20c, a flash memory 20d, a touch panel display 20e, an operation button group 20f, a digital camera 20g, a wireless LAN communication device 20h, a short-distance wireless communication device 20i, and the like.

The touch panel display 20e displays a screen that displays a message to the user, a screen for prompting the user to input a command or information, a screen that displays a result of processing executed by the CPU 20a, and the like. Further, the touch panel display 20e sends a signal that indicates a touched position to the CPU 20a.

The operation button group 20f is configured from a button for returning to a home screen, a button for determining something, a button for adjusting a sound volume, a button for switching ON/OFF of a power supply, and the like. The digital camera 20g captures various images.

The wireless LAN communication device 20h performs communication with the image forming apparatus 1 according to a protocol such as the TCP/IP through a base station that configures a communication line 3.

In the ROM 20c or the flash memory 20d, a client program 2P1 is stored. The client program 2P1 is a program for using a file temporarily providing function in the terminal device 2.

The client program 2P1 is loaded onto the RAM 20b, and is executed by the CPU 20a. Processing by the client program 2P1 will be described below with reference to FIG. 5 and the like.

Hereinafter, a file temporarily providing function will be described using a case in which the data sharing system 4 is used in a certain company as an example.

Each of employees, that is, each of users is provided with a unique user code. Further, each of the users is provided with one terminal device 2. Hereinafter, respective users are distinguished and described as users Ua, Ub, Uc, and the like, and the respective terminal devices 2 are distinguished and described as "terminal device 2A", "terminal device 2B", "terminal device 2C", and the like.

According to the server program 1P1, functions including a registered user storage unit 101, a present mode storage unit 102, a first mode switching unit 121, a connection information providing unit 122, a second mode switching unit 123, a target file preparation unit 124, a target file storage unit 125, a preparation completion notification unit 126, a provision appropriateness discrimination unit 131, a target file providing unit 132, a transmission destination storage unit 133, and a third mode switching unit 134, illustrated in FIG. 4, are realized in the image forming apparatus 1.

According to the client program 2P1, functions including a menu screen display unit 201, an operation content storage unit 202, a reception start command unit 211, a reception termination command unit 212, a specification screen display unit 213, a specification information transmission unit 214, a completion notification reception unit 215, a completion notification screen display unit 216, an allowance request unit 231, a connection information reception unit 232, a connection data storage unit 233, a file request unit 234, a file reception unit 235, and a file storage unit 236, illustrated in FIG. 5, are realized in the terminal device 2.

The reception start command unit 211 to the completion notification screen display unit 216 are used when the user of the terminal device 2 provides a file stored in the own box to another user.

Meanwhile, the allowance request unit 231 to a file storage unit 236 are used when a file stored in the box of another user is provided to the user of the terminal device 2.

Hereinafter, processing of the units and operations of the users illustrated in FIGS. 4 and 5 will be described using the next case as an example. A user Ua uses the image forming apparatus 1 on a regular basis. In the image forming apparatus 1, a user account of the user Ua is registered in advance, and the box of the user Ua is prepared. A user Ub and a user Uc use other image forming apparatuses on a regular basis. In the image forming apparatus 1, no user accounts and boxes of the users Ub and Uc are prepared. Under this condition, the user Ua provides a file stored in the own box to the users Ub and Uc.

[Storage of Data]

In the registered user storage unit 101 of the image forming apparatus 1, account data 5A of each user who uses the image forming apparatus 1 on a regular basis is stored in advance. To be specific, data that indicates a user code for recognizing the user, a password for authentication, and the like is stored for each user as the account data 5A.

Hereinafter, the user whose account data 5A is stored in the registered user storage unit 101 is described as "registered user", and a user whose account data 5A is not stored in the registered user storage unit 101 is described as "non-registered user". The user Ua is the registered user, and the users Ub and Uc are the non-registered users.

Note that, as the registered user storage unit 101, an existing database may be used. Alternatively, a database managed by a server may be used.

In the present mode storage unit 102, mode data 5B that indicates a mode presently set to the image forming apparatus 1 is stored. A default mode is a provision suspension mode.

The provision suspension mode is a mode in which a service of provision of a file stored in the box of the registered user to the terminal device 2 of the non-registered user is suspended. Other modes will be described in order.

[Common Processing to Modes]

Figure 6:
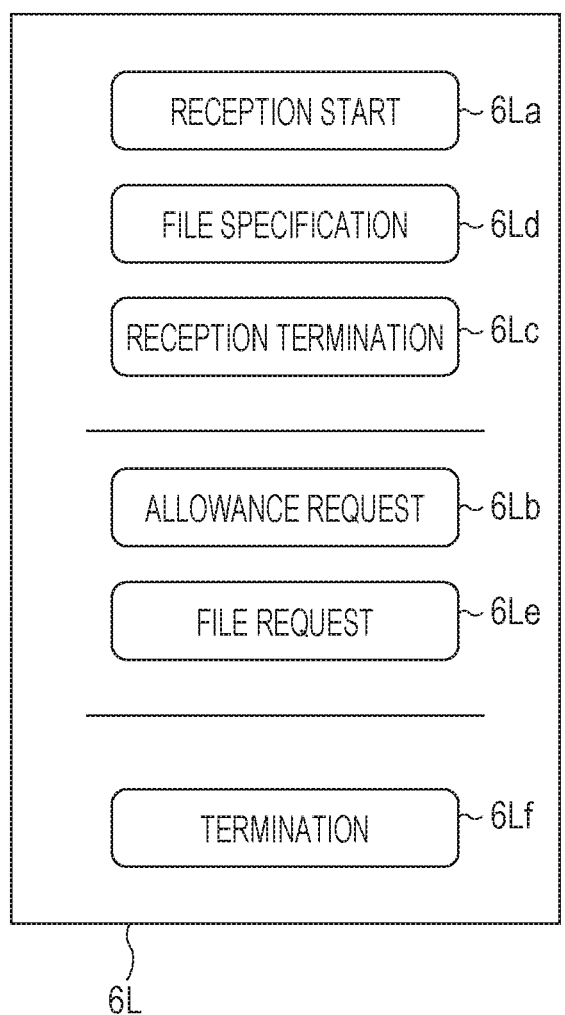
FIG. 6 is a diagram illustrating an example of a menu screen.

FIG. 6 is a diagram illustrating an example of a menu screen 6L.

In the terminal device 2, the menu screen display unit 201 displays the menu screen 6L as illustrated in FIG. 6 in the touch panel display 20e immediately after start of the client program 2P1, or when a predetermined command has been input. How to use the buttons arranged on the menu screen 6L will be described below in order.

The users Ua, Ub, and Uc get together near the image forming apparatus 1. Then, the client program 2P1 is started in the terminal devices 2 of the users (that is, the terminal devices 2A, 2B, and 2C).

When the users wish to cause the own terminal device 2 to perform communication with the image forming apparatus 1 by short-distance wireless means, the users bring the own terminal device 2 into contact with a predetermined position of the image forming apparatus 1, for example, the touch panel display 10e. In a case where a proximity sensor or a touch sensor is provided in the short-distance wireless communication device 10h, the users may bring the own terminal device 2 into contact with the proximity sensor or the touch sensor. Hereinafter, a case of bringing the terminal device 2 into contact with the touch panel display 10e will be exemplarily described.

Then, in the image forming apparatus 1, when an object is detected by the touch panel display 10e, the short-distance wireless communication device 10h searches for neighbor devices. Then, two terminal devices 2 are found. The short-distance wireless communication device 10h and the short-distance wireless communication devices 20i of the terminal devices 2 then establish connection based on a predetermined protocol.

[Provision of File]

Figure 12:
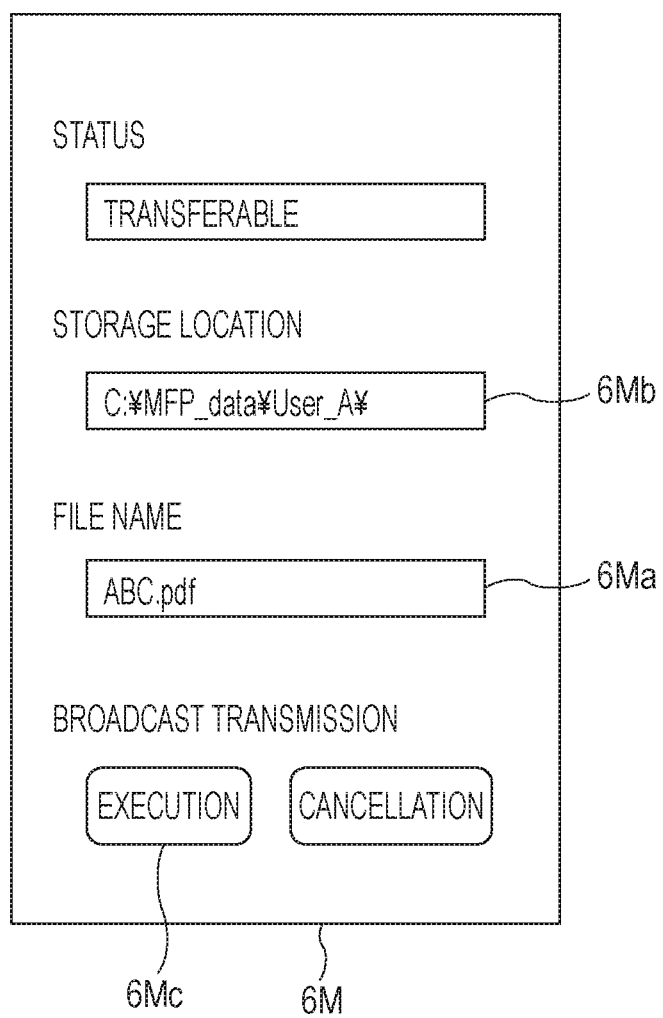
FIG. 12 is a diagram illustrating an example of a specification screen.
Figure 13:
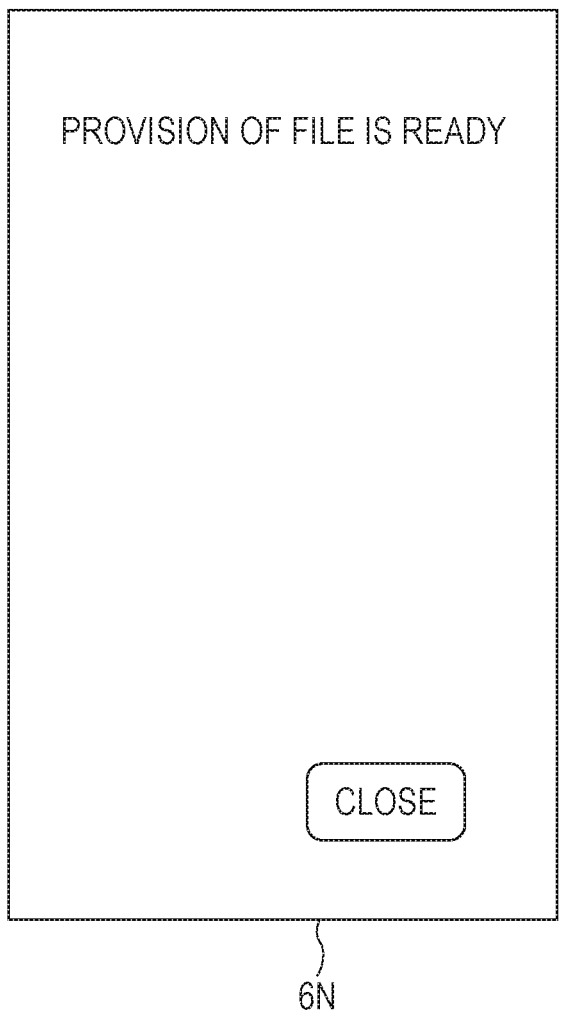
FIG. 13 is a diagram illustrating an example of a completion notification screen.

FIGS. 7 to 11 are sequence diagrams illustrating an example of a flow of processing of devices of when three users perform a series of operations. FIG. 12 is a diagram illustrating an example of a specification screen 6M. FIG. 13 is a diagram illustrating an example of a completion notification screen 6N.

The units of the image forming apparatus 1 and the units of the terminal device 2 execute processing in procedures illustrated in FIGS. 7 to 11 according to operations by the users.

The user Ua causes the terminal device 2A to start the client program 2P1. Then, in the terminal device 2A, the menu screen display unit 201 displays the menu screen 6L in the touch panel display 20e, as described above (step #801 in FIG. 7).

Here, the user Ua presses a reception start button 6La from among the buttons on the menu screen 6L. The reception start button 6La is a button for switching the mode of the image forming apparatus 1 to a desire reception mode.

Then, the terminal device 2A accepts data that indicates that the reception start button 6La has been pressed, and stores the data in the operation content storage unit 202 as operation content data 5C (step #802).

The user Ua then brings the terminal device 2A close to or into contact with the touch panel display 10e.

When the touch panel display 10e of the image forming apparatus 1 has detected that the object has been close to the touch panel display 10e (step #701), the short-distance wireless communication device 10h of the image forming apparatus 1 and the short-distance wireless communication device 20i of the terminal device 2A establish connection based on the predetermined protocol, as described above (steps #702 and #803).

The reception start command unit 211 of the terminal device 2A commands the image forming apparatus 1 to start reception of desire of provision of a file based on the operation content data 5C stored in the operation content storage unit 202 (step #804). At this time, the reception start command unit 211 controls the short-distance wireless communication device 20i so that reception start command data 5D that indicates the command of the start of the reception and an identifier (the user code of the user Ua in this example) of the user of the terminal device 2A is transmitted to the image forming apparatus 1. Note that, after the transmission, the operation content data 5C is deleted from the operation content storage unit 202.

In the image forming apparatus 1, when the reception start command data 5D has been received (step #703), the first mode switching unit 121 executes switching of the mode as follows.

The first mode switching unit 121 recognizes whether the terminal device 2A is for the registered user by checking whether the user code indicated in the reception start command data 5D is stored in the registered user storage unit 101. To be specific, if the account data 5A that indicates the user code is stored in the registered user storage unit 101, the first mode switching unit 121 recognizes that the terminal device 2A is for the registered user. If the account data 5A is not stored, the first mode switching unit 121 recognizes that the terminal device 2A is not for the registered user.

Then, when the first mode switching unit 121 has recognized that the terminal device 2A is for the registered user (step #704), the first mode switching unit 121 switches the mode of the image forming apparatus 1 from the provision suspension mode to the desire reception mode (step #705). At this time, the mode data 5B is updated to indicate the desire reception mode. The desire reception mode is a mode to receive desire of provision of a file from the terminal device 2 of the non-registered user.

When the transmission of the reception start command data 5D from the terminal device 2A to the image forming apparatus 1 is completed, the connection between the devices is disconnected (steps #706 and #805).

The user Ub causes the terminal device 2B to start the client program 2P1. Then, in the terminal device 2B, the menu screen display unit 201 displays the menu screen 6L of FIG. 6 in the touch panel display 20e, as described above (step #831).

Here, the user Ub presses an allowance request button 6Lb from among the buttons on the menu screen 6L. The allowance request button 6Lb is a button for requesting allowance of provision of a file.

Then, in the terminal device 2B, data that indicates that the allowance request button 6Lb has been pressed is received, and is stored in the operation content storage unit 202 as the operation content data 5C (step #832).

The user Ub then brings the terminal device 2B close to or into contact with the touch panel display 10e.

When the touch panel display 10e of the image forming apparatus 1 has detected that the object has been close to the touch panel display 10e (step #707), the short-distance wireless communication device 10h of the image forming apparatus 1 and the short-distance wireless communication device 20i of the terminal device 2B establish connection (steps #708 and #833).

The allowance request unit 231 of the terminal device 2B requests the image forming apparatus 1 to allow provision of a file based on the operation content data 5C stored in the operation content storage unit 202 (step #834). At this time, the allowance request unit 231 controls the short-distance wireless communication device 20i so that allowance command data 5E that indicates the request of the allowance and an identifier of the user of the terminal device 2B (the user code of the user Ub in this example) are transmitted to the image forming apparatus 1. Note that, after the transmission, the operation content data 5C is deleted from the operation content storage unit 202.

In the image forming apparatus 1, when the allowance command data 5E has been received (step #709), the connection information providing unit 122 executes processing for transmitting connection data 5F as follows when the present mode is the desire reception mode. Note that the connection data 5F is data that indicates information for later connecting the terminal device 2 with the image forming apparatus 1 through the communication line 3. To be specific, the connection data 5F indicates an IP address or a media access control (MAC) address of the image forming apparatus 1.

The connection information providing unit 122 recognizes whether the terminal device 2B is for the non-registered user by checking whether the user code indicated in the allowance command data 5E is stored in the registered user storage unit 101. To be specific, if the account data 5A that indicates the user code is not stored in the registered user storage unit 101, the connection information providing unit 122 recognizes that the terminal device 2B is for the non-registered user. If the account data 5A is stored, the connection information providing unit 122 recognizes that the terminal device 2B is not for the non-registered user.

Then, when the connection information providing unit 122 has recognized that the terminal device 2B is for the non-registered user (step #710 of FIG. 8), the connection information providing unit 122 controls the short-distance wireless communication device 10h so that the connection data 5F is transmitted to a transmission source of the allowance command data 5E, that is, the terminal device 2B (step #711).

In the terminal device 2B, the connection information reception unit 232 receives the connection data 5F (step #835), and stores the connection data 5F in the connection data storage unit 233 (step #836).

When the transmission of the connection data 5F from the image forming apparatus 1 to the terminal device 2B is completed, the connection between the devices is disconnected (steps #712 and #837).

The user Uc performs, for the terminal device 2C and the image forming apparatus 1, an operation similar to the operation performed by the user Ub for the terminal device 2B and the image forming apparatus 1.

Then, the units of the terminal device 2C execute processing similar to steps #831 to #837 (steps #861 to #867). Further, the units of the image forming apparatus 1 execute processing similar to steps #707 to #712 for the terminal device 2C, instead of for the terminal device 2B (steps #713 to #718).

With the above processing, preparation for provision of a file in the terminal device 2B and the terminal device 2C is completed.

Here, the user Ua presses a reception termination button 6Lc on the menu screen 6L (see FIG. 6) of the terminal device 2A. The reception termination button 6Lc is a button for terminating the desire reception mode.

Figure 9:
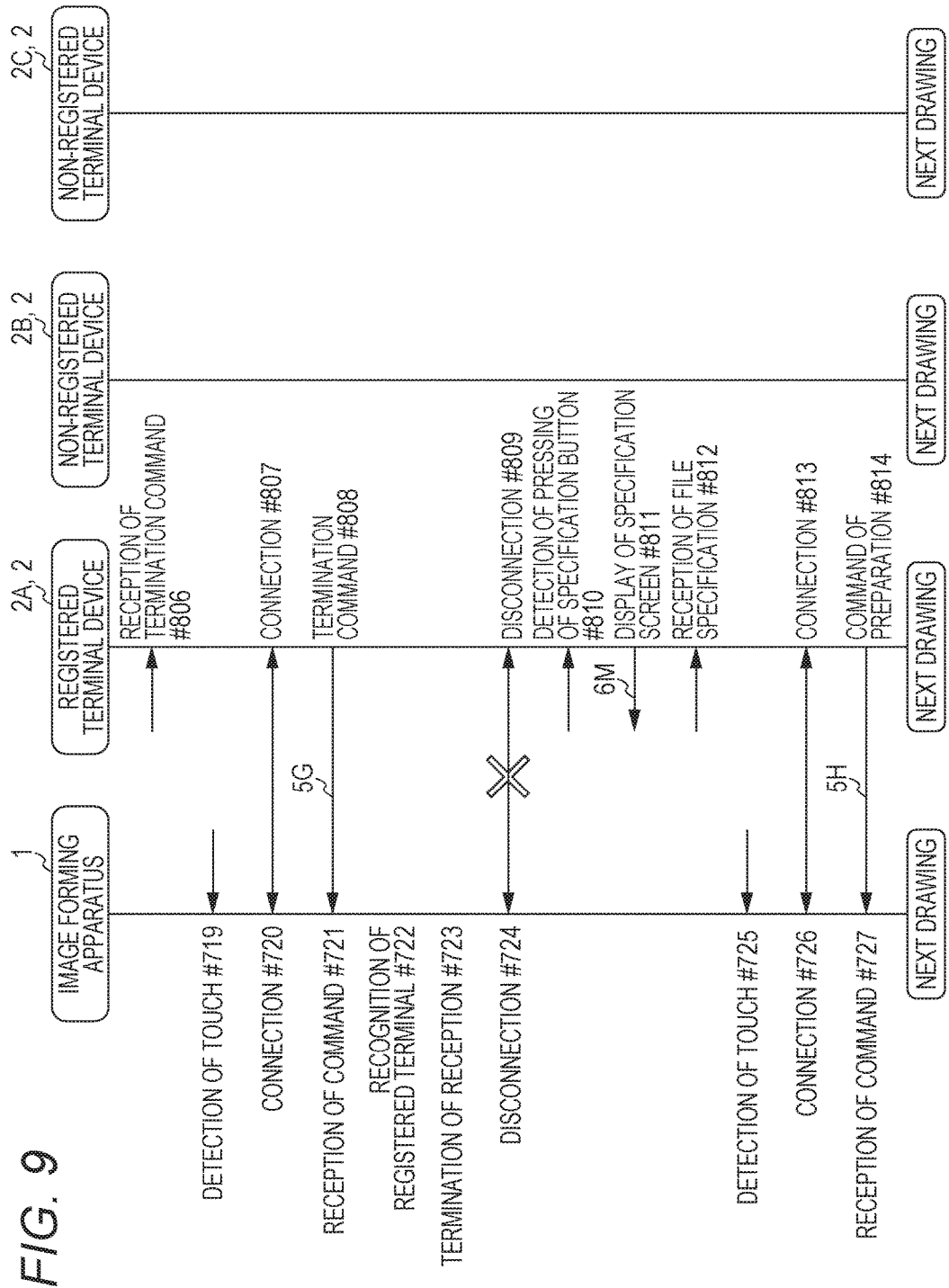
FIG. 9 is a sequence diagram illustrating an example of a flow of processing of devices of when three users perform a series of operations.

Then, the terminal device 2A receives data that indicates that the reception termination button 6Lc has been pressed, and stores the data in the operation content storage unit 202 as the operation content data 5C (step #806 of FIG. 9).

The user Ua then brings the terminal device 2A close to or into contact with the touch panel display 10e.

When the touch panel display 10e of the image forming apparatus 1 has detected that the object has been close to the touch panel display 10e (step #719), the short-distance wireless communication device 10h of the image forming apparatus 1 and the short-distance wireless communication device 20i of the terminal device 2A establish connection (steps #720 and #807).

The reception termination command unit 212 of the terminal device 2A commands the image forming apparatus 1 to terminate reception of desire of provision of a file based on the operation content data 5C stored in the operation content storage unit 202 (step #808). At this time, the reception termination command unit 212 controls the short-distance wireless communication device 20i so that reception termination command data 5G that indicates the command of the termination of the reception and an identifier of the user of the terminal device 2A, that is, the user code of the user Ua are transmitted to the image forming apparatus 1. Note that, after the transmission, the operation content data 5C is deleted from the operation content storage unit 202.

In the image forming apparatus 1, when the reception termination command data 5G has been received (step #721), the second mode switching unit 123 executes switching of the mode as follows.

The second mode switching unit 123 recognizes whether the terminal device 2A is for the registered user by checking whether the user code indicated in the reception termination command data 5G is stored in the registered user storage unit 101.

When the second mode switching unit 123 has recognizes that the terminal device 2A is for the registered user (step #722), the second mode switching unit 123 switches the mode of the image forming apparatus 1 to a specification wait mode (step #723). At this time, the mode data 5B is updated to indicate the specification wait mode. Accordingly, the desire reception mode is terminated. The specification wait mode is a mode to wait for specification of a file to be provided.

When the transmission of the reception termination command data 5G from the terminal device 2A to the image forming apparatus 1 is completed, the connection between the devices is disconnected (steps #724 and #809).

Further, the user Ua presses a file specification button 6Ld from among the buttons on the menu screen 6L of FIG. 6.

In the terminal device 2A, when the specification screen display unit 213 has detected that the file specification button 6Ld has been pressed (step #810), the specification screen display unit 213 terminates the display of the menu screen 6L, and displays a specification screen 6M as illustrated in FIG. 12 in the touch panel display 20e (step #811).

Here, the user Ua inputs, to a text box 6Ma, a file name of the file to be provided to the users Ub and Uc from among a plurality of files, of which the user Ua has an access right, and inputs, to a text box 6Mb, a pass (storage location) of the box in which the file is stored. Then, the user Ua presses an execution button 6Mc.

Then, data that indicates the contents input to the text box 6Ma and the text box 6Mb is received, and is stored to the operation content storage unit 202 as the operation content data 5C (step #812).

The user Ua then causes the terminal device 2A to touch the touch panel display 10e.

When the touch panel display 10e of the image forming apparatus 1 has detected that the object has been close to the touch panel display 10e (step #725), the short-distance wireless communication device 10h of the image forming apparatus 1 and the short-distance wireless communication device 20i of the terminal device 2A establish connection (steps #726 and #813).

The specification information transmission unit 214 of the terminal device 2A commands the image forming apparatus 1 to prepare the file to be provided and wait for a request of the file, based on the operation content data 5C stored in the operation content storage unit 202 (step #814).

At this time, the specification information transmission unit 214 controls the short-distance wireless communication device 20i so that file specification data 5H is transmitted to the image forming apparatus 1. In the file specification data 5H, the file name and the pass input by the user Ua, and the user code of the user Ua are indicated. The file name and the pass are the same as those indicated in the operation content data 5C. Note that, after the transmission, the operation content data 5C is deleted from the operation content storage unit 202.

In the image forming apparatus 1, when the file specification data 5H has been received (step #727), the target file preparation unit 124 executes processing for preparing the file to be provided as follows.

The target file preparation unit 124 recognizes whether the terminal device 2A is for the registered user by checking whether the user code indicated in the file specification data 5H is stored in the registered user storage unit 101.

When the target file preparation unit 124 has recognized that the terminal device 2A is for the registered user (step #728 of FIG. 10), the target file preparation unit 124 reads the file of the file name indicated in the file specification data 5H from the box of the pass indicated in the file specification data 5H, and stores the file to the target file storage unit 125 (step #729). Then, the mode of the image forming apparatus 1 is changed to a transmission request reception mode (step #730). At this time, the mode data 5B is updated to indicate the transmission request reception mode. Accordingly, the preparation of the file to be provided is completed, and reception of the request of the file is started. Hereinafter, the prepared file is described as "target file 5J".

The preparation completion notification unit 126 controls the short-distance wireless communication device 10h so that preparation completion data 5K that indicates that the preparation is completed is transmitted to the transmission source of the file specification data 5H, that is, the terminal device 2A (step #731).

When the transmission of the preparation completion data 5K from the image forming apparatus 1 to the terminal device 2A is completed, the connection between the devices is disconnected (steps #732 and #816).

In the terminal device 2A, when the preparation completion data 5K has been received (step #815), the completion notification screen display unit 216 terminates the display of the specification screen 6M, and displays the completion notification screen 6N that notifies that the preparation of provision of the file is completed, as illustrated in FIG. 13, to the touch panel display 20e (step #817).

When the completion notification screen 6N is displayed, the user Ua notifies the completion of the preparation to the users Ub and Uc.

Then, the user Ub operates the terminal device 2B as follows. The user Ub presses a file request button 6Le from among the buttons on the menu screen 6L of FIG. 6. The file request button 6Le is a button for requesting the image forming apparatus 1 to transmit the prepared file.

In the terminal device 2B, when the pressing of the allowance request button 6Lb has been detected (step #838), the file request unit 234 requests the image forming apparatus 1 to transmit the file as follows.

The file request unit 234 controls the wireless LAN communication device 20h to be connected to the device having the IP address or the MAC address indicated in the connection data 5F, that is, the image forming apparatus 1 (step #839). Then, the file request unit 234 controls the wireless LAN communication device 20h so that file request data 5L is transmitted to the image forming apparatus 1 through the communication line 3 (step #840). In the file request data 5L, the command of the transmission and the user code of the user Ub are indicated.

In the image forming apparatus 1, when the file request data 5L has been received through the communication line 3 (step #734) after the connection with the terminal device 2B (step #733), the provision appropriateness discrimination unit 131 determines whether the target file 5J may be provided to the transmission source of the file request data 5L, that is, the terminal device 2B, when the present mode is the transmission request reception mode.

The provision appropriateness discrimination unit 131 recognizes whether the terminal device 2B is for the non-registered user by checking whether the user code indicated in the file request data 5L is stored in the registered user storage unit 101.

When the provision appropriateness discrimination unit 131 can recognize that the terminal device 2B is for the non-registered user (step #735), the provision appropriateness discrimination unit 131 checks whether the target file 5J has already been provided to the terminal device 2B (step #736). To be specific, if transmission destination data 5M that indicates the user code indicated in the file request data 5L is stored in the transmission destination storage unit 133, the provision appropriateness discrimination unit 131 determines that the target file 5J has already been provided. If the transmission destination data 5M is not stored, the provision appropriateness discrimination unit 131 determines that the target file 5J has not yet been provided.

The provision appropriateness discrimination unit 131 then determines that the target file 5J may be provided when the terminal device 2B is for the non-registered user and the target file 5J has not yet been provided. If not, the provision appropriateness discrimination unit 131 determines that the target file 5J is not to be provided.

When the provision appropriateness discrimination unit 131 has determined that the target file 5J may be provided, the target file providing unit 132 reads the target file 5J from the target file storage unit 125, and controls the NIC 10g so that the target file 5J is transmitted to the terminal device 2B through the communication line 3 (step #737). After the transmission, the transmission destination data 5M is stored to the transmission destination storage unit 133 (step #738). In the transmission destination data 5M, the user code indicated in the file request data 5L is indicated.

Then, in the terminal device 2B, the file reception unit 235 receives the target file 5J (step #841), and stores the target file 5J to the file storage unit 236 (step #842).

The user Uc performs, for the terminal device 2C, an operation similar to the operation performed by the user Ub for the terminal device 2B.

Figure 11:
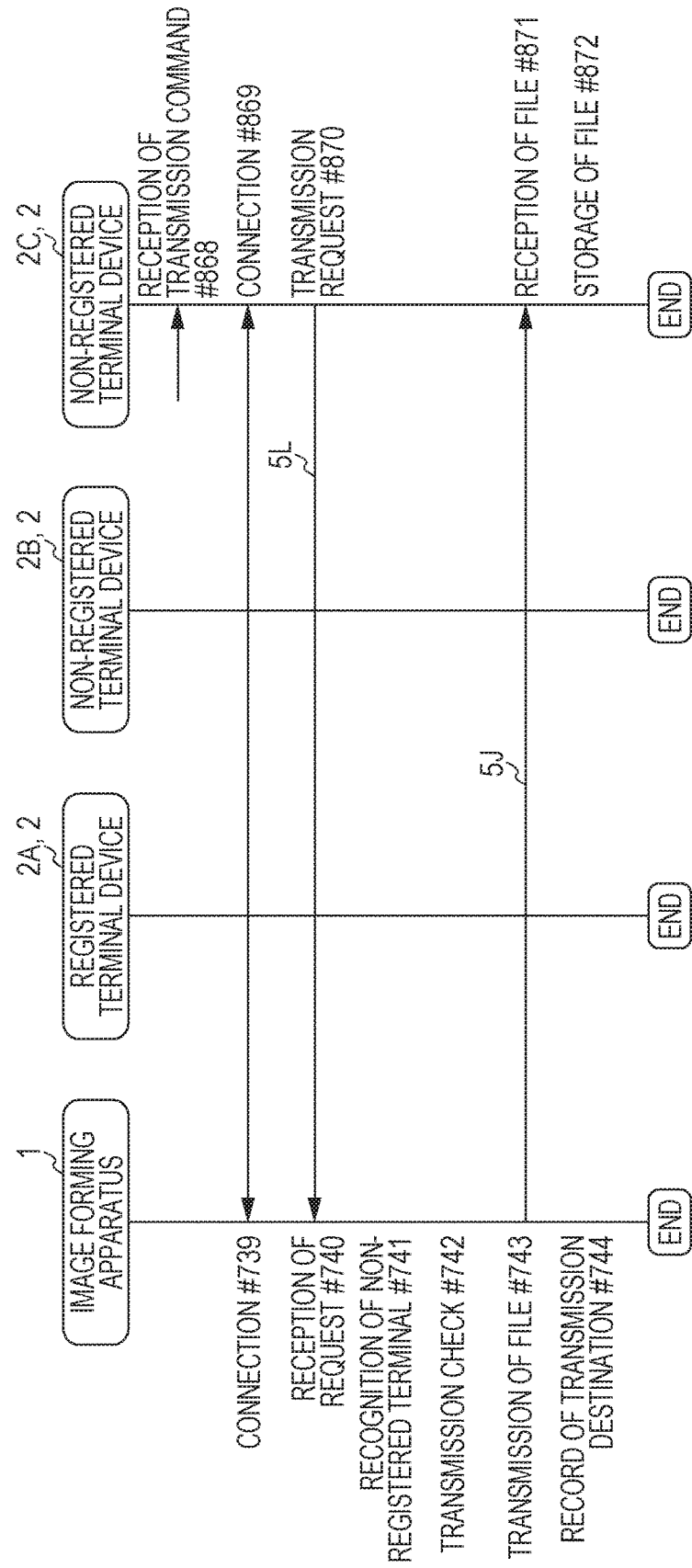
FIG. 11 is a sequence diagram illustrating an example of a flow of processing of devices of when three users perform a series of operations.

Then, the units of the terminal device 2C execute processing similar to steps #838 to #842 (steps #868 to #872 of FIG. 11). Further, the units of the image forming apparatus 1 execute processing similar to steps #733 to #738 for the terminal device 2C, instead of for the terminal device 2B (steps #739 to #744).

Following that, even if the user Ub or Uc performs the same operation again and requests the target file 5J, the image forming apparatus 1 determines that the target file 5J has been provided in step #736 or #742, and does not provide the target file 5J.

Note that the users Ub and Uc can perform the above-described operation without shifting time, that is, in parallel. In a case of IP communication, the image forming apparatus 1 can establish connection at the same time with a plurality of devices. Further, the connection established in steps #733 and #839 is appropriately disconnected after the terminal device 2B receives the target file 5J. Similarly, the connection established in steps #739 and #869 is appropriately disconnected after the terminal device 2C receives the target file 5J.

In each of the terminal devices 2, when a termination button 6Lf is pressed, the client program 2P1 is terminated.

In the image forming apparatus 1, the third mode switching unit 134 terminates the transmission request reception mode and switches the mode to a provision suspension mode, after a predetermined time has passed after the mode of the image forming apparatus 1 is switched to the transmission request reception mode. Alternatively, the third mode switching unit 134 may switch the mode to the provision suspension mode when a command is given from the terminal device 2A. Alternatively, the transmission destinations (the terminal devices 2B and 2C in the present example) of the connection data 5F are recorded, and the third mode switching unit 134 may switch the mode to the provision suspension mode when the target file 5J has been transmitted to all of the transmission destinations.

Figure 14:
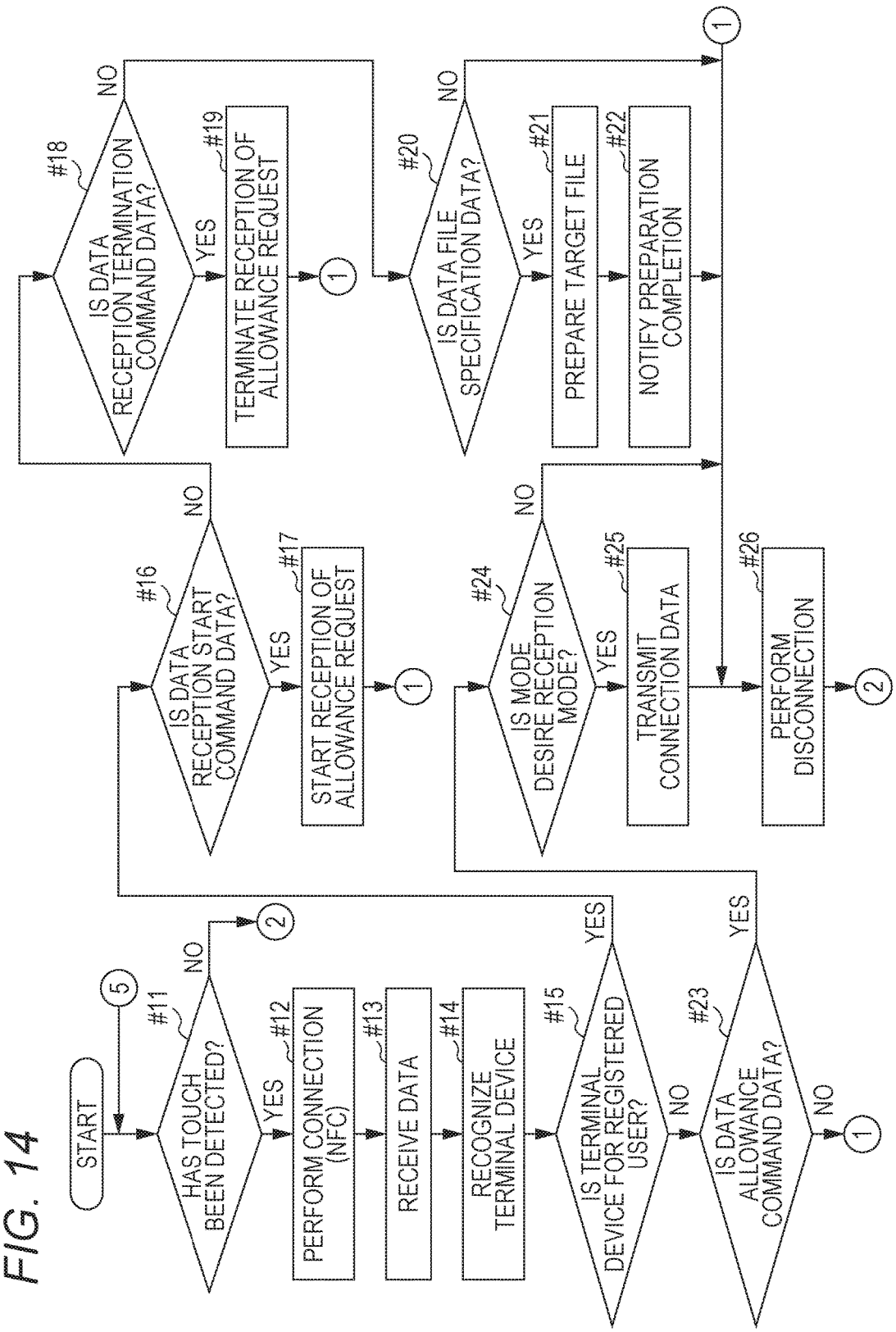
FIG. 14 is a flowchart for describing an example of a flow of overall processing of the image forming apparatus.
Figure 15:
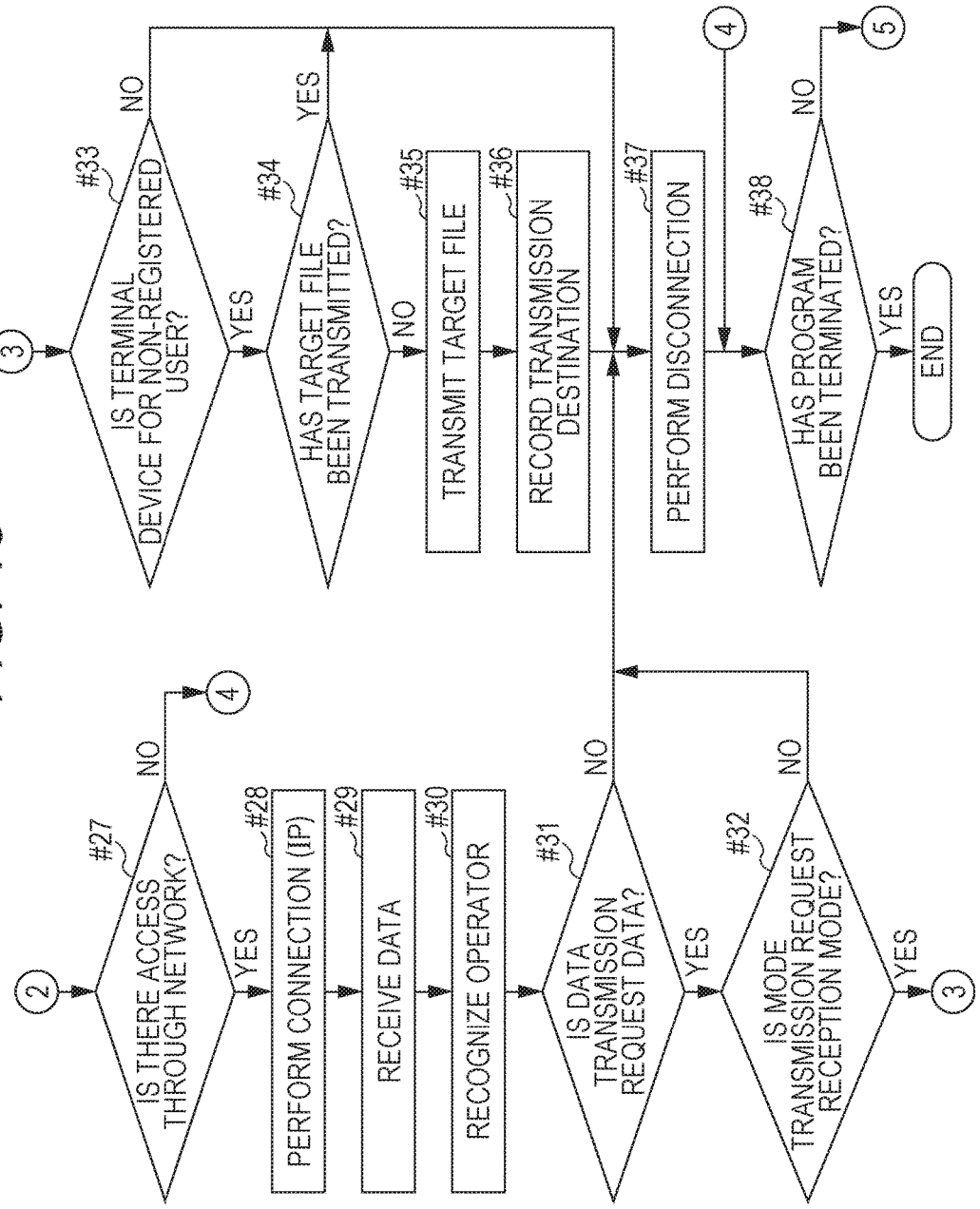
FIG. 15 is a flowchart for describing an example of a flow of overall processing of the image forming apparatus.
Figure 16:
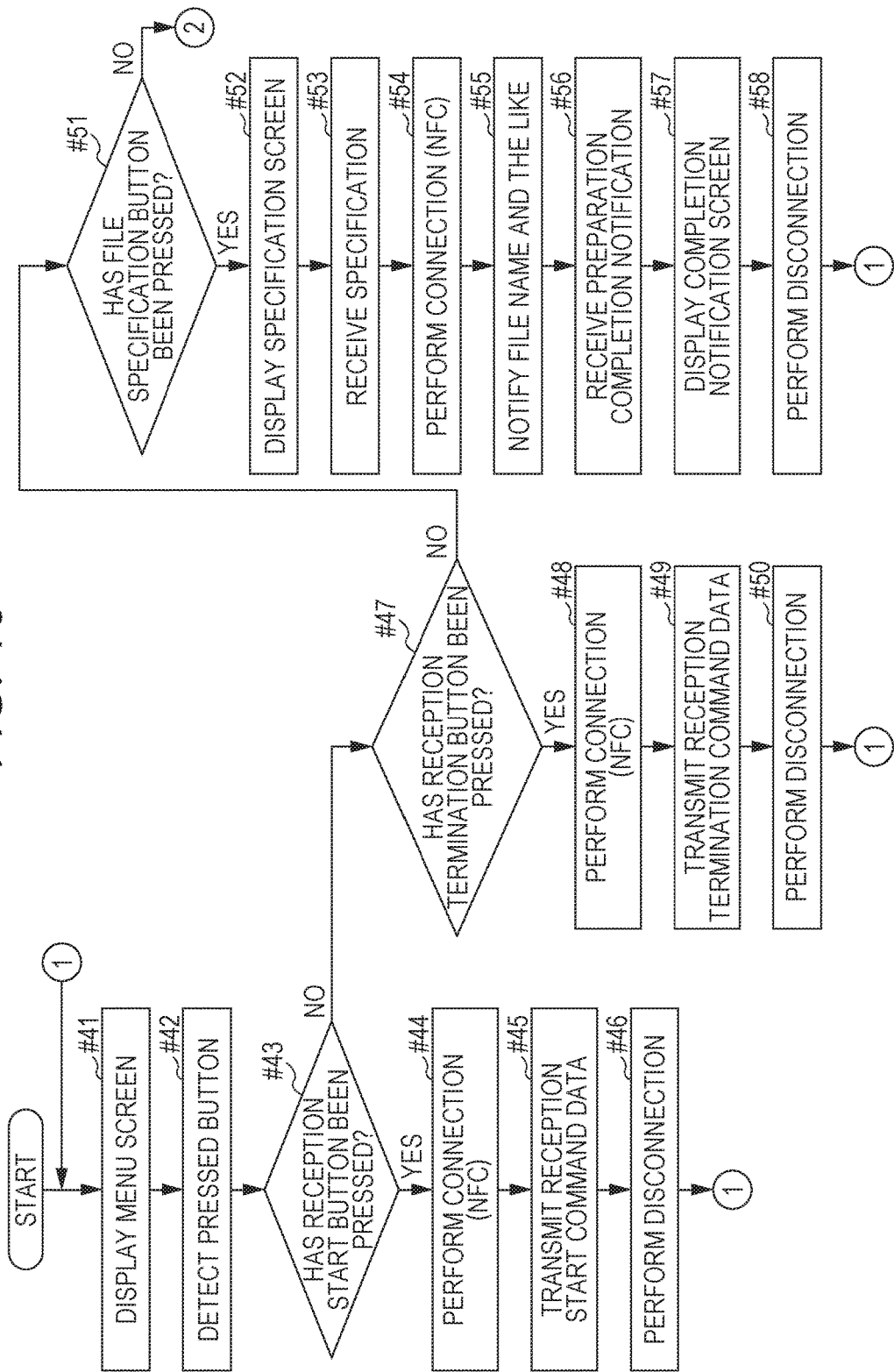
FIG. 16 is a flowchart for describing an example of a flow of overall processing of the terminal device.
Figure 17:
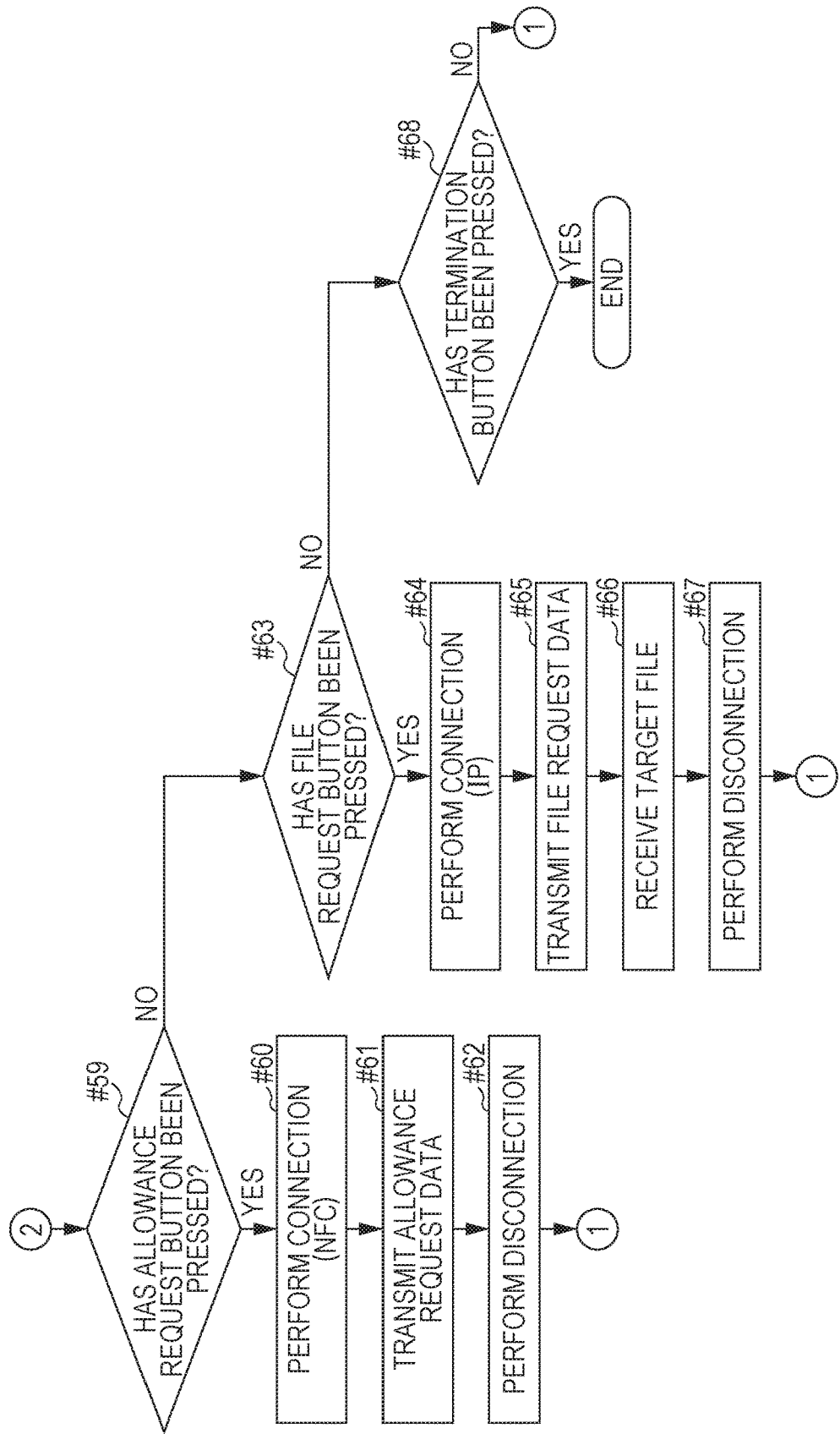
FIG. 17 is a flowchart for describing an example of a flow of overall processing of the terminal device.

FIGS. 14 to 15 are flowcharts for describing an example of a flow of overall processing of the image forming apparatus 1. FIGS. 16 to 17 are flowcharts for describing an example of a flow of overall processing of the terminal device 2.

Next, flows of overall processing of the image forming apparatus 1 and the terminal device 2 will be described with reference to the flowcharts.

The image forming apparatus 1 executes the processing in the procedure illustrated in FIGS. 14 and 15 based on the server program 1P1.

When the image forming apparatus 1 has detected that the terminal device 2 has come close to or has touched the image forming apparatus 1 (Yes in step #11 of FIG. 14), the image forming apparatus 1 establishes connection with the terminal device 2 by the short-distance wireless communication (step #12), and receives data from the terminal device 2 (step #13).

The image forming apparatus 1 recognizes whether the terminal device 2 is for the registered user or for the non-registered user based on the user code indicated in the data (step #14).

When the terminal device 2 is for the registered user (Yes in step #15), the image forming apparatus 1 performs processing as follows based on the data.

When the data is the reception start command data 5D (Yes in step #16), the image forming apparatus 1 switches the mode to the desire reception mode, and starts reception of the allowance command data 5E from the terminal device 2 of the non-registered user (step #17).

When the data is the reception termination command data 5G (Yes in step #18), the image forming apparatus 1 terminates the desire reception mode and switches the mode to the specification wait mode, and terminates the reception of the allowance command data 5E (step #19).

When the data is the file specification data 5H (Yes in step #20), the image forming apparatus 1 switches the mode of the image forming apparatus 1 from the specification wait mode to the transmission request reception mode, reads the file specified with the file specification data 5H from the box, and prepares (stores) the file to the target file storage unit 125 as the target file 5J (step #21). Then, the image forming apparatus 1 notifies that the preparation is completed by returning the preparation completion data 5K to the terminal device 2 as the transmission source (step #22).

Meanwhile, when the terminal device 2 as the transmission source is for the non-registered user (No in step #15), the image forming apparatus 1 transmits the connection data 5F to the terminal device 2 (step #25) when the data received from the terminal device 2 is the allowance command data 5E (Yes in step #23), and the present mode is the desire reception mode (Yes in step #24).

The image forming apparatus 1 disconnects the connection established in step #12 (step #26) when exchange of the data with the terminal device 2 is completed.

When there is an access from the terminal device 2 through the communication line 3 (Yes in step #27 of FIG. 15), the image forming apparatus 1 establishes connection with the terminal device 2 by IP communication (step #28), receives data from the terminal device 2 (step #29), and recognizes the terminal device 2 (step #30).

When the data is the file request data 5L (Yes in step #31), the present mode is the transmission request reception mode (Yes in step #32), the terminal device 2 is for the non-registered user (Yes in step #33), and the target file 5J has not yet been transmitted to the terminal device 2 (No in step #34), the image forming apparatus 1 transmits the target file 5J to the terminal device 2 (step #35). The image forming apparatus 1 then records the transmission of the target file 5J to the terminal device 2 (step #36), and disconnects the connection established in step #27 (step #37).

The image forming apparatus 1 appropriately executes the above-described processing until the server program 1P1 is terminated.

The terminal device 2 executes processing in the procedure illustrated in FIGS. 16 and 17 based on the client program 2P1.

After the startup of the client program 2P1, the terminal device 2 displays the menu screen 6L (see FIG. 6) (step #41 of FIG. 16).

Here, the user presses one of the buttons on the menu screen 6L. When the terminal device 2 has detected the pressed button (step #42), the terminal device 2 executes next processing according to the button.

When the terminal device 2 has detected that the reception start button 6La has been pressed (Yes in step #43), the terminal device 2 establishes connection with the image forming apparatus 1 by the short-distance wireless communication (step #44), and transmits the reception start command data 5D to the image forming apparatus 1 (step #45). After the transmission, the terminal device 2 disconnects the connection (step #46).

When the terminal device 2 has detected that the reception termination button 6Lc has been pressed (Yes in step #47), the terminal device 2 establishes connection with the image forming apparatus 1 by the short-distance wireless communication (step #48), and transmits the reception termination command data 5G to the image forming apparatus 1 (step #49). After the transmission, the terminal device 2 disconnects the connection (step #50).

When the terminal device 2 has detected that the file specification button 6Ld has been pressed (Yes in step #51), the terminal device 2 displays the specification screen 6M (see FIG. 12) (step #52).

Here, the user specifies the file name and the storage location (the pass of the box) of the file to be provided to another user.

When the terminal device 2 has received the content specified by the user (step #53), the terminal device 2 establishes connection with the image forming apparatus 1 by the short-distance wireless communication (step #54), and transmits data that indicates the received content to the image forming apparatus 1 as the file specification data 5H (step #55). Then, when the terminal device 2 has received the preparation completion data 5K from the image forming apparatus 1 (step #56), the terminal device 2 displays the completion notification screen 6N (see FIG. 13) (step #57), and disconnects the connection (step #58).

When the terminal device 2 has detected that the allowance request button 6Lb has been pressed (Yes in step #59 of FIG. 17), the terminal device 2 establishes connection with the image forming apparatus 1 by the short-distance wireless communication (step #60), and transmits the allowance command data 5E to the image forming apparatus 1 (step #61). After the transmission, the terminal device 2 disconnects the connection (step #62).

When the terminal device 2 has detected that the file request button 6Le has been pressed (Yes in step #63), the terminal device 2 establishes connection with the image forming apparatus 1 through the communication line 3 (step #64), and transmits the file request data 5L to the image forming apparatus 1 (step #65). Then, when the terminal device 2 has received the target file 5J from the image forming apparatus 1 (step #66), the terminal device 2 disconnects the connection (step #67). Note that, when the terminal device 2 cannot receive the target file 5J even after a predetermined time has passed, the terminal device 2 disconnects the connection.

When the terminal device 2 has detected that the termination button 6Lf has been pressed (Yes in step #68), the terminal device 2 terminates the processing by the client program 2P1.

The terminal device 2 appropriately executes the processing of steps #41 to #67 until the termination button 6Lf is pressed.

According to the first embodiment, the processing for providing the target file 5J from the image forming apparatus 1 to the terminal device 2 of the non-registered user can be more easily performed than a conventional case while the security is constantly held. Further, the data for accessing the target file 5J, that is the connection data 5F is provided to the terminal device 2 by the short-distance wireless communication, and the target file 5J is provided to the terminal device 2 by the IP communication. Therefore, the target file 5J can be more promptly provided to a plurality of the terminal devices 2 than a case of providing the target file 5J by the short-distance wireless communication.

Second Embodiment

Figure 18:
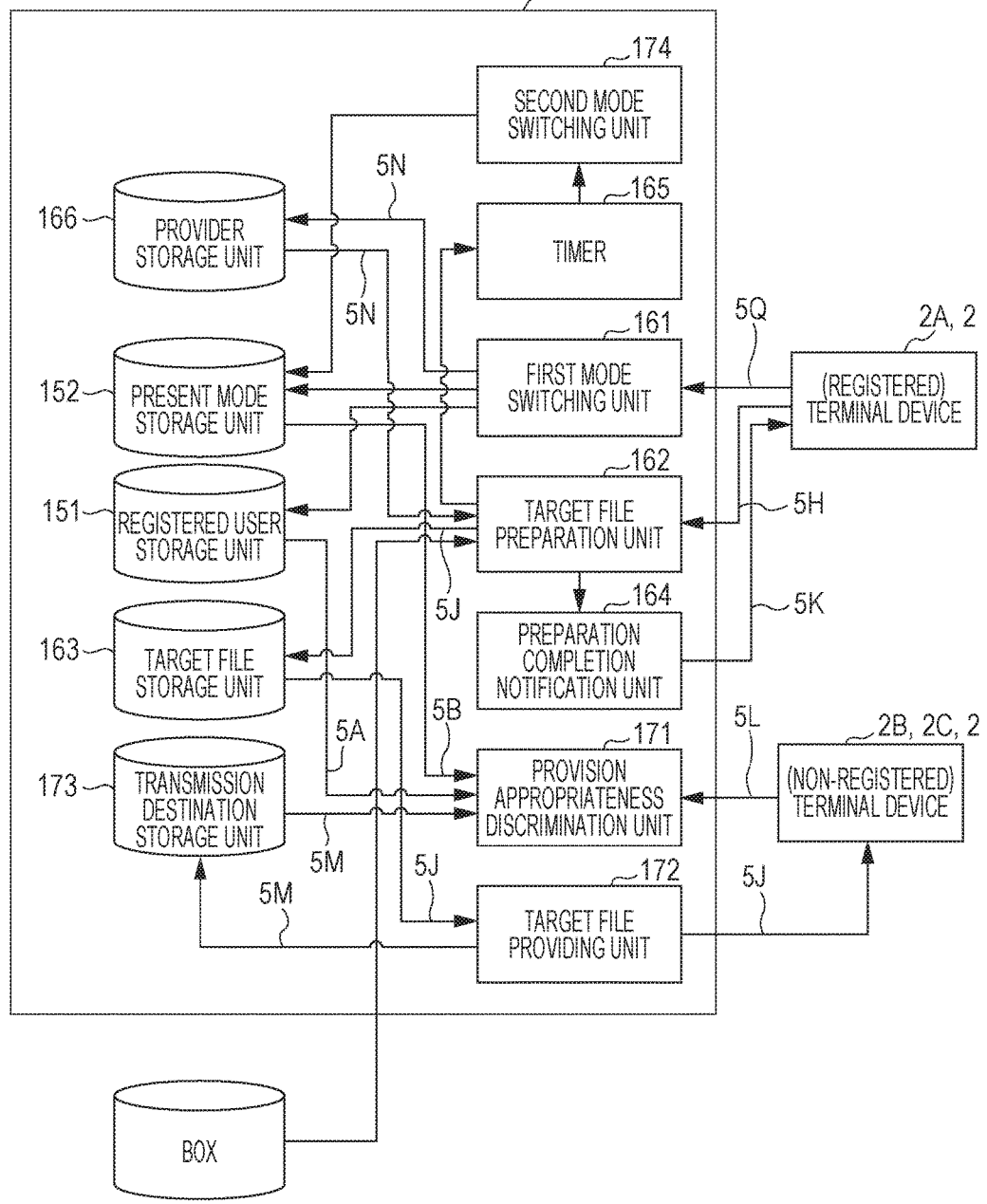
FIG. 18 is a diagram illustrating an example of a functional configuration of an image forming apparatus.
Figure 19:
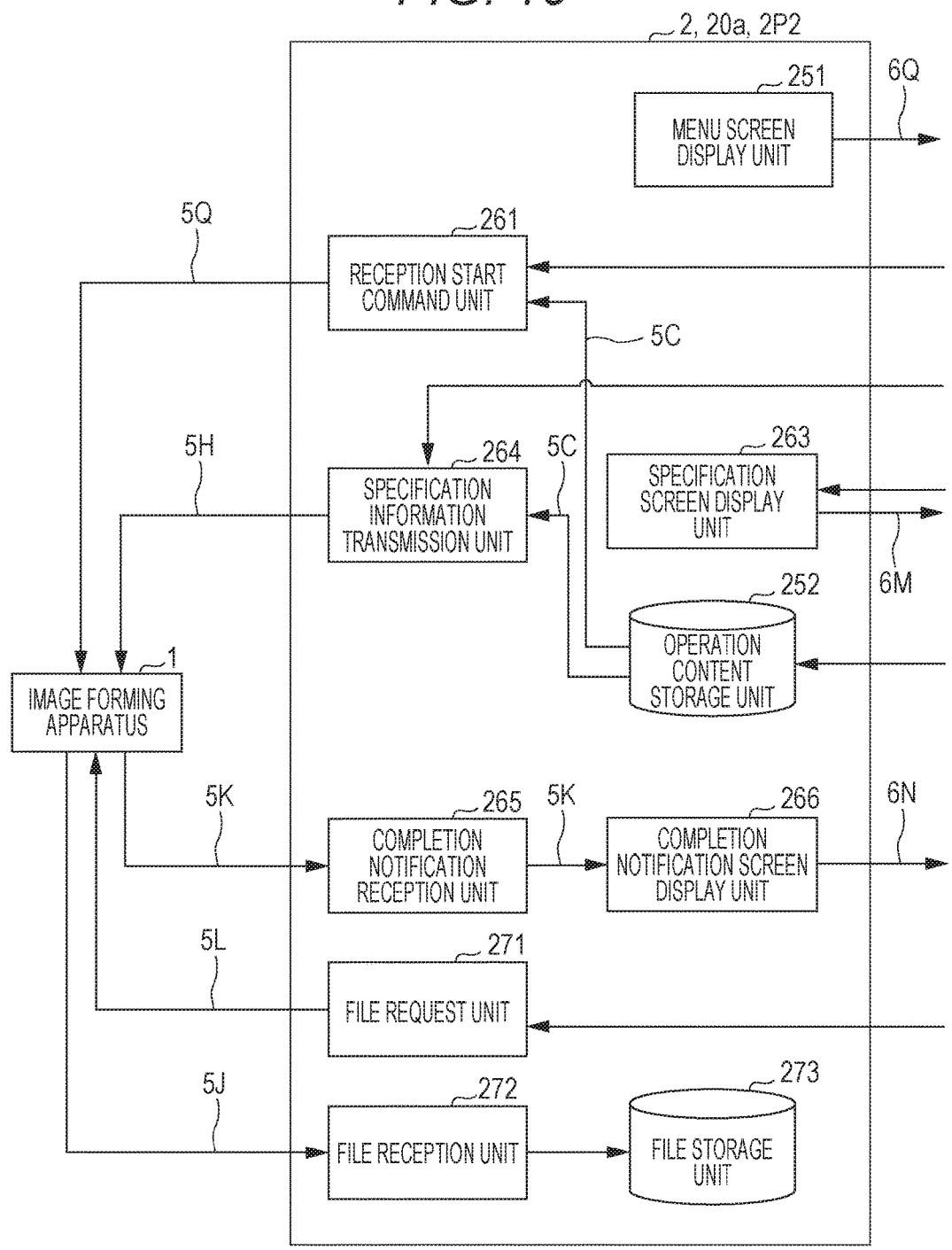
FIG. 19 is a diagram illustrating an example of a functional configuration of a terminal device.
Figure 20:
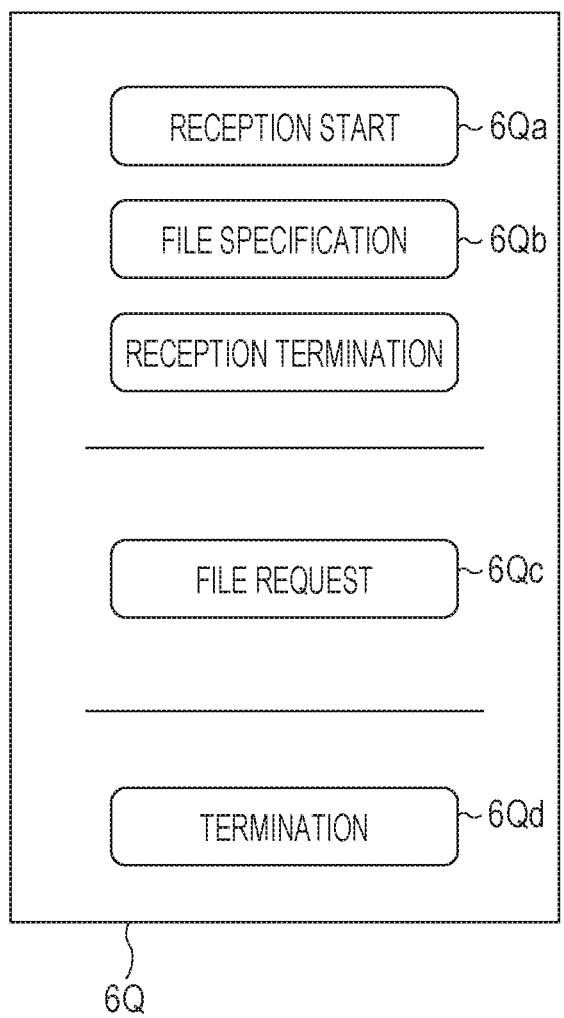
FIG. 20 is a diagram illustrating an example of a menu screen.
Figure 21:
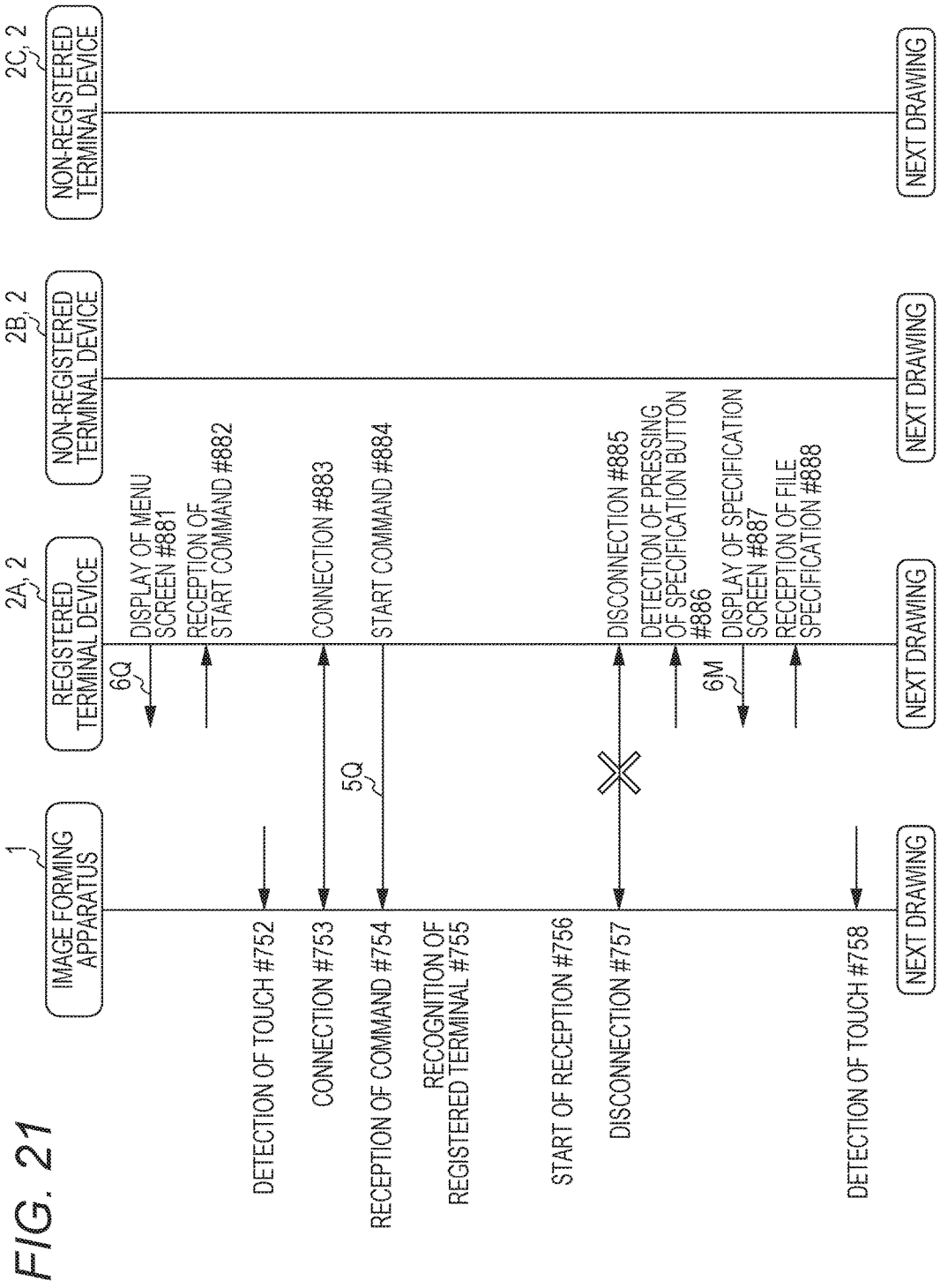
FIG. 21 is a sequence diagram illustrating an example of a flow of processing of devices of when three users perform a series of operations.

FIG. 18 is a diagram illustrating an example of a functional configuration of an image forming apparatus 1. FIG. 19 is a diagram illustrating an example of a functional configuration of a terminal device 2. FIG. 20 is a diagram illustrating an example of a menu screen 6Q. FIGS. 21 to 24 are sequence diagrams illustrating an example of a flow of processing of devices of when three users perform a series of operations.

In the first embodiment, the terminal device 2 acquires connection data 5F from the image forming apparatus 1 by short-distance wireless communication, and acquires a target file 5J from the image forming apparatus 1 by IP communication based on the connection data 5F. In the second embodiment, the terminal device 2 acquires the target file 5J from the image forming apparatus 1 by the short-distance wireless communication without acquiring the connection data 5F. Hereinafter, this mechanism will be described. In addition, a handling method in a case where unrelated processing interrupts processing of provision of the target file 5J will be described. Description of points overlapping with the first embodiment is omitted.

An overall configuration of a data sharing system 4 is similar to the first embodiment, and is as described in FIG. 1.

A hardware configuration of the image forming apparatus 1 and a hardware configuration of the terminal device 2 are also similar to the first embodiment, and are as illustrated in FIGS. 2 and 3, respectively.

Note that a server program 1P2 is stored in an auxiliary storage device 10d of the image forming apparatus 1, in place of a server program 1P1. Further, a client program 2P2 is stored in a flash memory 20d of the terminal device 2, in place of a client program 2P1.

According to the server program 1P2, functions including a registered user storage unit 151, a present mode storage unit 152, a first mode switching unit 161, a target file preparation unit 162, a target file storage unit 163, a preparation completion notification unit 164, a timer 165, a provider storage unit 166, a provision appropriateness discrimination unit 171, a target file providing unit 172, a transmission destination storage unit 173, and a second mode switching unit 174, illustrated in FIG. 18, are realized.

Meanwhile, according to the client program 2P2, functions including a menu screen display unit 251, an operation content storage unit 252, a reception start command unit 261, a specification screen display unit 263, a specification information transmission unit 264, a completion notification reception unit 265, a completion notification screen display unit 266, a file request unit 271, a file reception unit 272, and a file storage unit 273, illustrated in FIG. 19, are realized in the terminal device 2.

Hereinafter, processing of units and operations of users respectively illustrated in FIGS. 18 and 19 will be described using the following case as an example. Circumstances of users Ua, Ub, and Uc are similar to the first embodiment. In the second embodiment, a user Ud further causes the image forming apparatus 1 to execute processing unrelated to exchange of the target file 5J. The user Ud is a registered user, and has a terminal device 2D.

In the registered user storage unit 151 of the image forming apparatus 1, account data 5A of each user who uses the image forming apparatus 1 on a regular basis is stored in advance, similarly to the registered user storage unit 101 (see FIG. 4) of the first embodiment.

In the present mode storage unit 152, mode data 5B that indicates a mode presently set to the image forming apparatus 1 is stored, similarly to the present mode storage unit 102 of the first embodiment.

The menu screen display unit 251 of the terminal device 2 displays a menu screen 6Q illustrated in FIG. 20 to a touch panel display 20e.

The units of the image forming apparatus 1 and the units of the terminal device 2 execute processing in procedures illustrated in FIGS. 21 to 24 according to operations of the users.

The user Ua causes a terminal device 2A to start the client program 2P1. Then, in the terminal device 2A, the menu screen display unit 251 displays the menu screen 6Q in the touch panel display 20e (step #881 of FIG. 21).

Here, the user Ua presses a reception start button 6Qa from among buttons on the menu screen 6Q, and causes the terminal device 2A to touch the touch panel display 10e.

Figure 7:
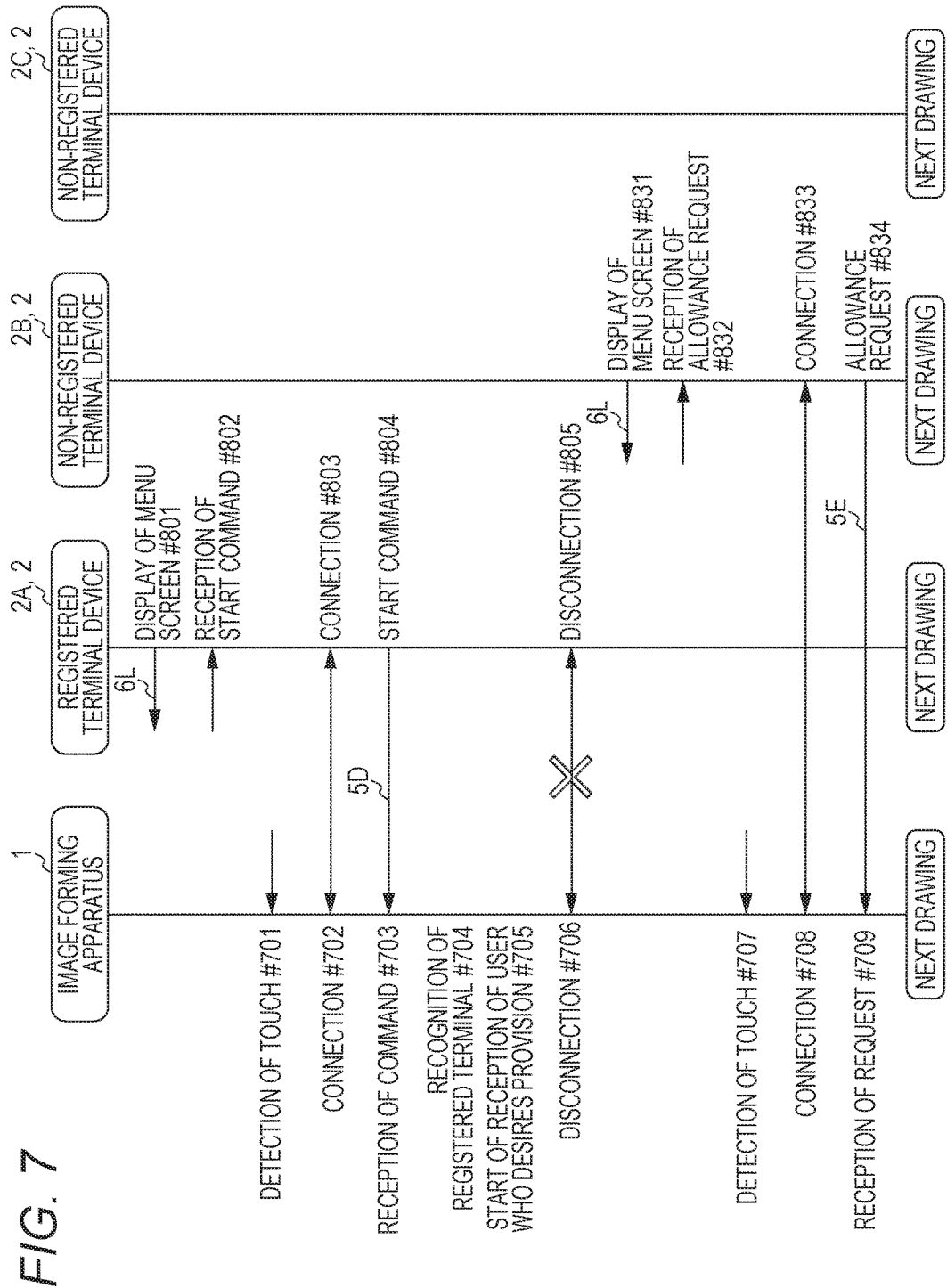
FIG. 7 is a sequence diagram illustrating an example of a flow of processing of devices of when three users perform a series of operations.
Figure 8:
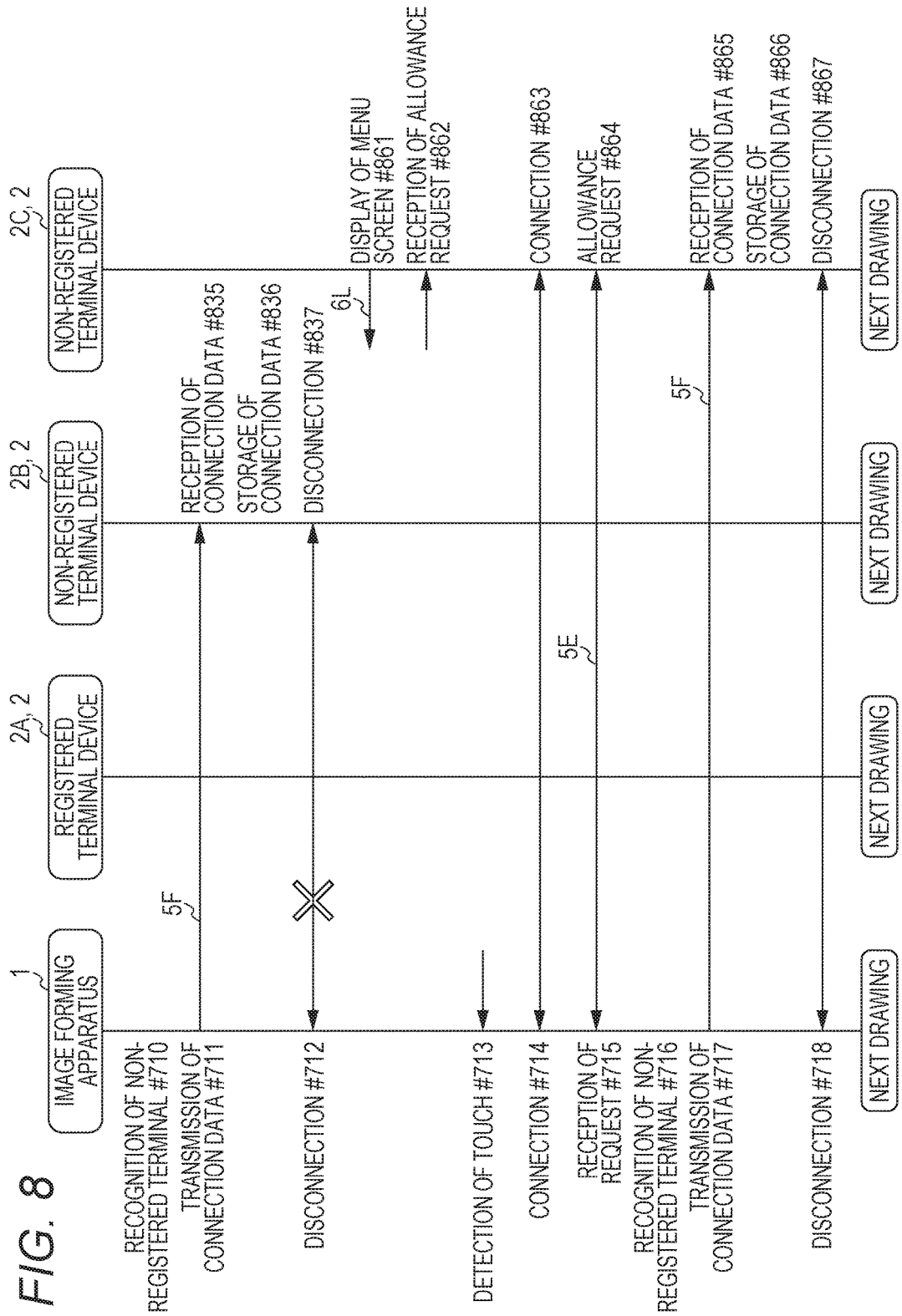
FIG. 8 is a sequence diagram illustrating an example of a flow of processing of devices of when three users perform a series of operations.

Then, the operation content storage unit 252 and the reception start command unit 261 of the terminal device 2A, the first mode switching unit 161 of the image forming apparatus 1, and the like execute processing basically similar to steps #701 to #706 and steps #803 to #805 of FIG. 7 (steps #751 to #754, steps #756 and #757, steps #883 to #885).

Note that, in the second embodiment, the reception start command unit 261 transmits reception start command data 5Q to the image forming apparatus 1, in place of the reception start command data 5D (step #884). In the reception start command data 5Q, a user code of a user (the user Ua in the present example) as a transmission source is indicated. Then, when the first mode switching unit 161 receives the reception start command data 5Q (step #753), the first mode switching unit 161 switches a mode of the image forming apparatus 1 to a transmission request reception mode, instead of a desire reception mode (step #756).

Further, provider data 5N that indicates the user code of the user (the user Ua in the present example) who provides the file is stored in the provider storage unit 166 of the image forming apparatus 1 (step #755). This user code is the same as the user code indicated in the reception start command data 5D.

While, in the first embodiment, the users Ub and Uc perform the operations, the user Ua continuously performs an operation to specify the file to be provided to the users Ub and Uc in the second embodiment. This operation is basically similar to the first embodiment. That is, the user Ua presses a file specification button 6Qb from among the buttons on the menu screen 6Q, and specifies the file through a specification screen 6M (see FIG. 12).

Figure 22:
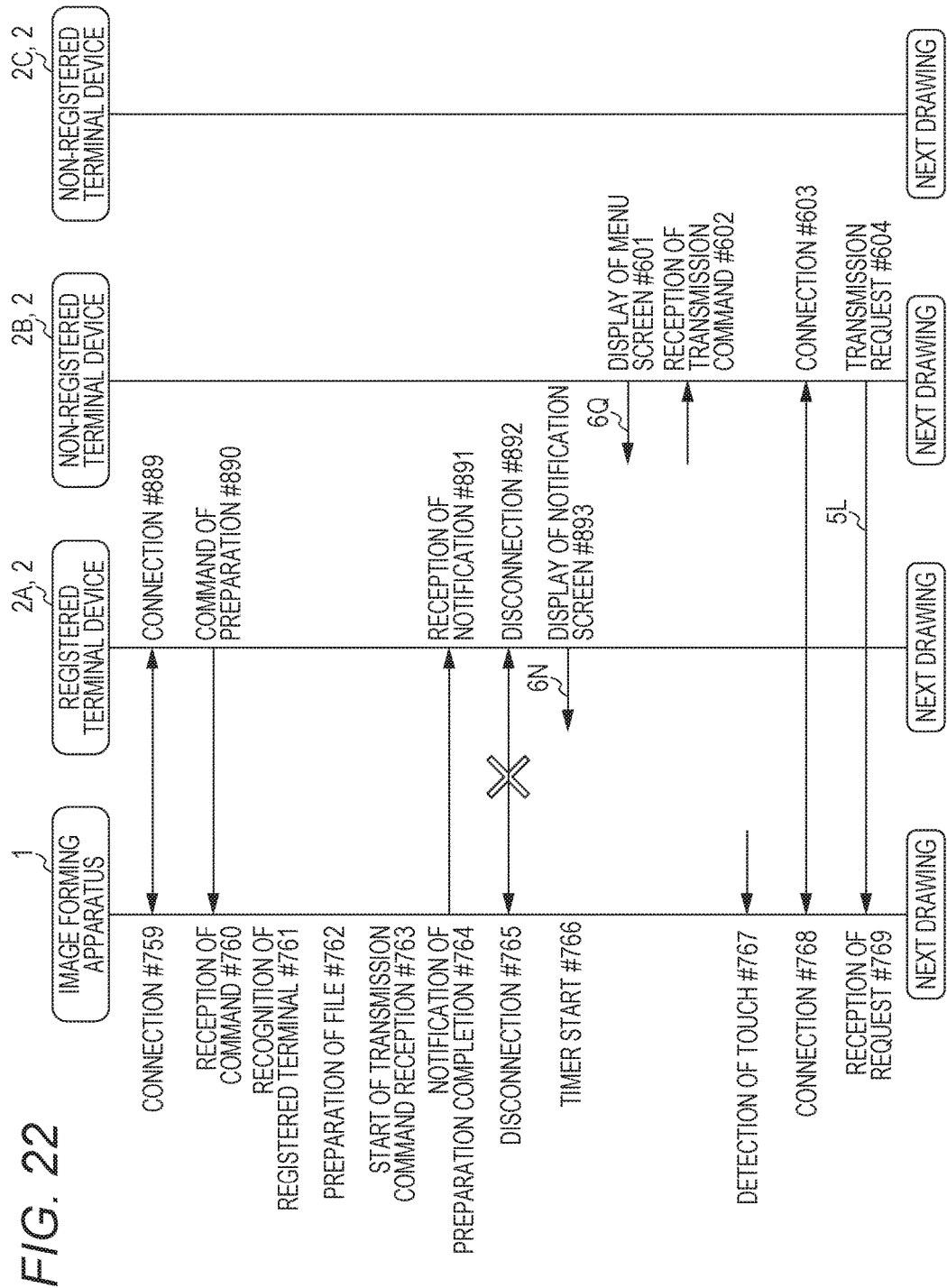
FIG. 22 is a sequence diagram illustrating an example of a flow of processing of devices of when three users perform a series of operations.
Figure 23:
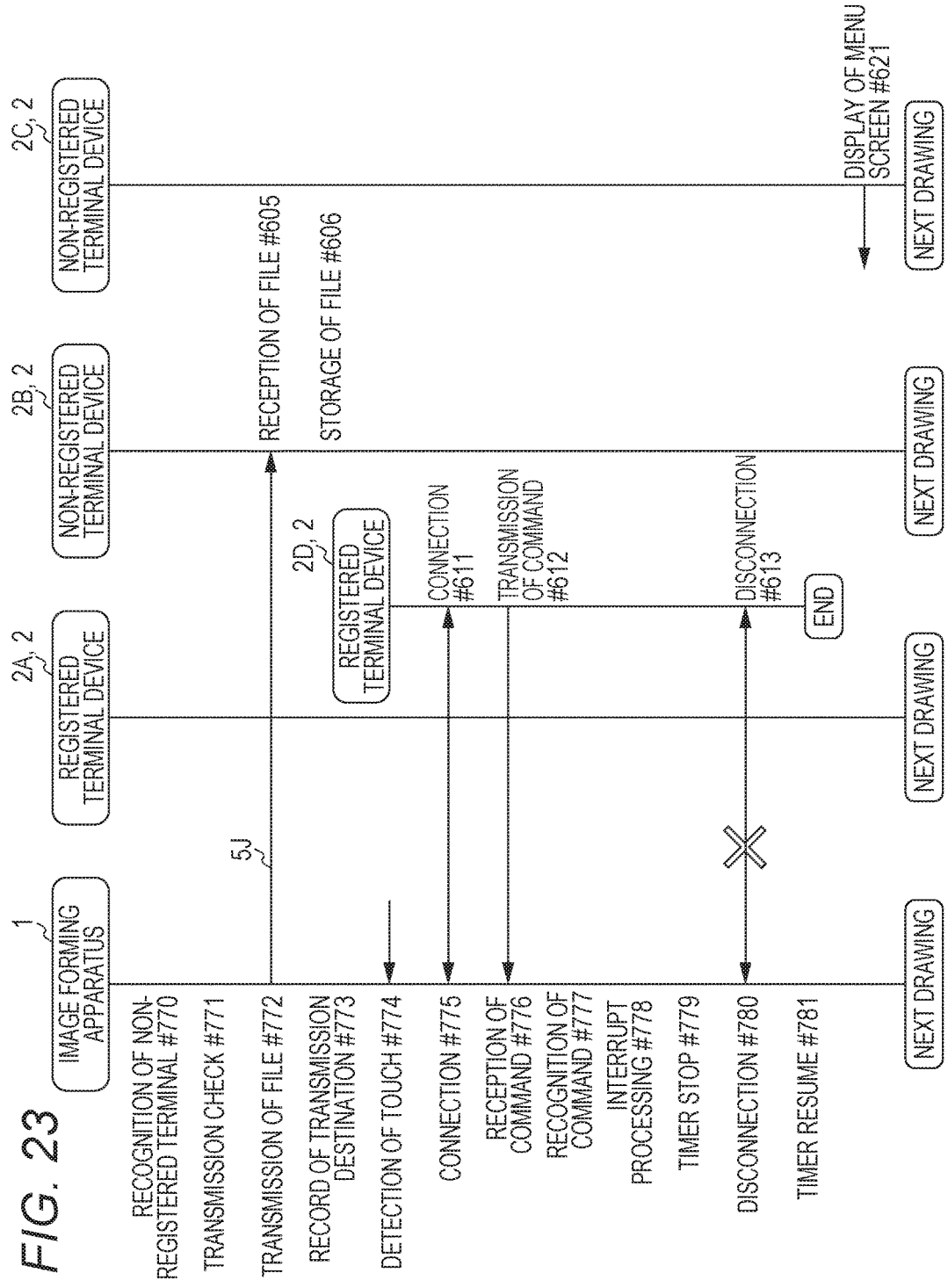
FIG. 23 is a sequence diagram illustrating an example of a flow of processing of devices of when three users perform a series of operations.

With the operation, the target file preparation unit 162, the target file storage unit 163, the preparation completion notification unit 164, and the like of the image forming apparatus 1 perform basically similar processing to the target file preparation unit 124, the target file storage unit 125, the preparation completion notification unit 126, and the like of the first embodiment (steps #758 to #765 of FIG. 22).

Further, the specification screen display unit 213, the specification information transmission unit 214, the completion notification reception unit 215, and the completion notification screen display unit 216, and the like of the terminal device 2A perform basically similar processing to the specification screen display unit 263, the specification information transmission unit 264, the completion notification reception unit 265, and the completion notification screen display unit 266, and the like of the first embodiment (steps #886 to #893).

Figure 10:
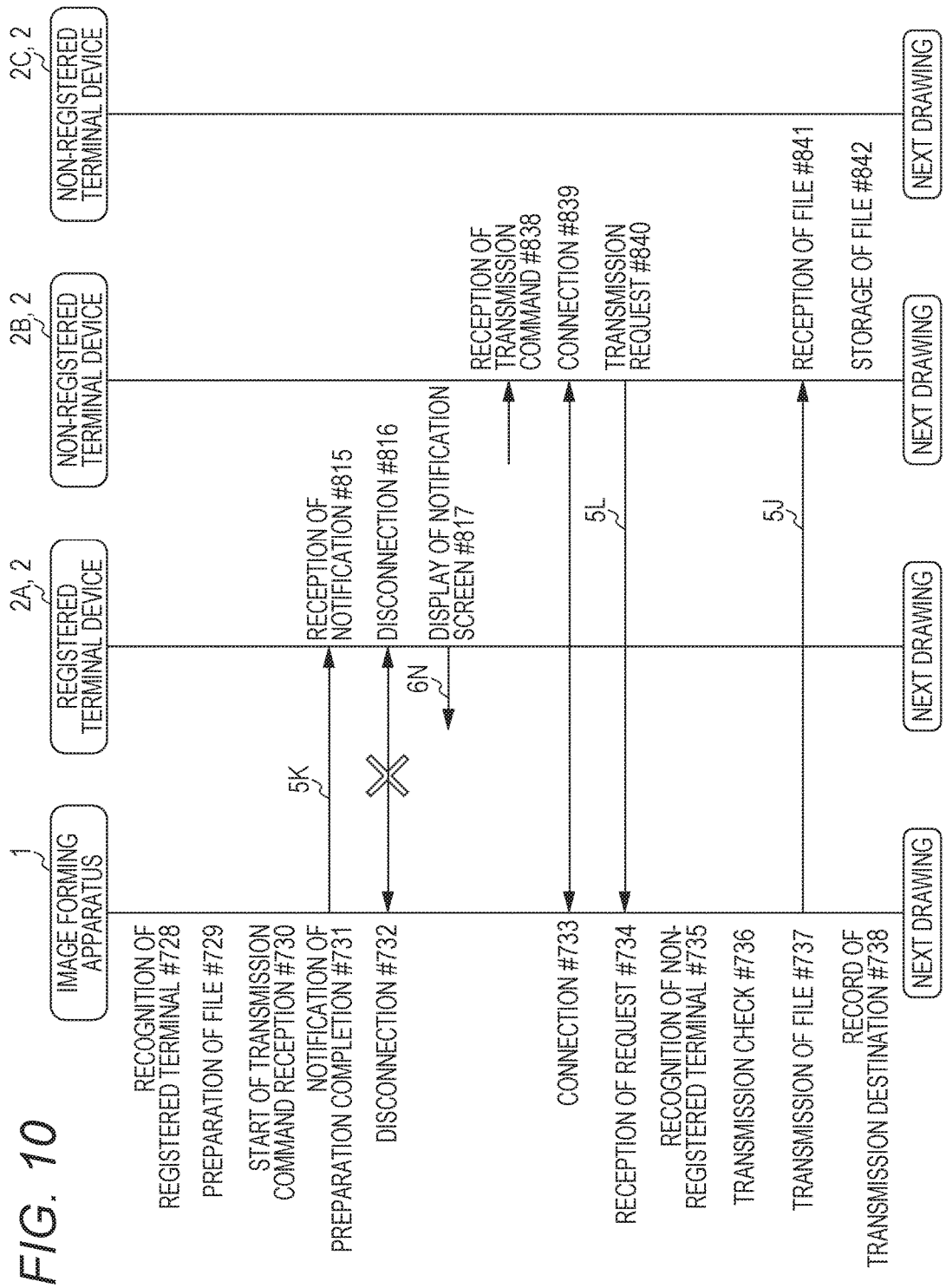
FIG. 10 is a sequence diagram illustrating an example of a flow of processing of devices of when three users perform a series of operations.

Processing of steps #758 to #765 is basically similar to the processing of steps #725 to #732 of FIGS. 9 and 10. Processing of steps #886 to #893 is basically similar to the processing of steps #810 to #817.

Note that, in the second embodiment, the target file preparation unit 162 performs processing for storing the target file 5J to the target file storage unit 163 when a transmission source of file specification data 5H is the same as a transmission source of reception start command data 5D. To be specific, the target file preparation unit 162 performs the processing for storing the target file 5J to the target file storage unit 163 when the user code indicated in the file specification data 5H and the user code indicated in the provider data 5N stored in step #755 are matched.

Further, when the user codes are matched, the timer 165 starts measurement of time that has passed since the target file 5J could have been provided (step #766).

When a completion notification screen 6N (see FIG. 13) is displayed, the user Ua notifies completion of preparation to the users Ub and Uc, similarly to the first embodiment.

The user Ub operates the terminal device 2B as follows. The user Ub causes the terminal device 2B to start the client program 2P2.

Then, in the terminal device 2B, the menu screen display unit 251 displays the menu screen 6Q (see FIG. 20) to the touch panel display 20e (step #601). The user Ub presses a file request button 6Qc.

Then, data that indicates that the file request button 6Qc has been pressed is received, and is stored in the operation content storage unit 202 as operation content data 5C (step #602).

The user Ub then causes the terminal device 2B to touch a touch panel display 10e.

When the touch panel display 10e of the image forming apparatus 1 has detected that the object has been close to the touch panel display 10e (step #767), a short-distance wireless communication device 10h of the image forming apparatus 1 and a short-distance wireless communication device 20i of the terminal device 2A establish connection (steps #768 and #603).

In the terminal device 2B, the file request unit 271 controls the short-distance wireless communication device 20i so that file request data 5L is transmitted to the image forming apparatus 1 based on the operation content data 5C stored in the operation content storage unit 202 (step #604).

In the image forming apparatus 1, when the file request data 5L has been received (step #769), the provision appropriateness discrimination unit 171 determines whether the target file 5J may be provided to a transmission source of the file request data 5L, that is, the terminal device 2B (steps #770 to #771 of FIG. 23) when the present mode is a transmission request reception mode, similarly to the provision appropriateness discrimination unit 131 of the first embodiment (see steps #735 and #736 of FIG. 10).

When the provision appropriateness discrimination unit 171 has determined that the target file 5J may be provided, the target file providing unit 172 reads the target file 5J from the target file storage unit 125, and controls the short-distance wireless communication device 20i so that the target file 5J is transmitted to the terminal device 2B (step #772). After the transmission, transmission destination data 5M is stored to the transmission destination storage unit 173, similarly to the first embodiment (step #773).

Then, in the terminal device 2B, the file reception unit 272 receives the target file 5J (step #605), and stores the target file 5J to the file storage unit 273 (step #606).

Following that, the user Uc may perform an operation similarly to the user Ub. However, assume that the user Ud needs to interrupt and use the image forming apparatus 1 for urgent business.

Therefore, the user Ud operates the terminal device 2D, then brings the terminal device 2D close to or into contact with the touch panel display 10e.

When the touch panel display 10e of the image forming apparatus 1 has detected that the object has been close to the touch panel display 10e (step #774), the short-distance wireless communication device 10h of the image forming apparatus 1 and the short-distance wireless communication device 20i of the terminal device 2D establish connection (steps #775 and #611). Then, in the image forming apparatus 1, when data and a command are received from the terminal device 2D (step #776), the command is recognized to be unrelated to provision of the target file 5J (step #777). Processing of the recognition may just be performed by an operating system.

Then, processing regarding the command is executed in the units (step #778). For example, when image data and a print command are received, processing of printing is executed by a print unit 10k. Further, when the command is recognized to be unrelated to the provision of the target file 5J, the timer 165 is temporarily stopped (step #779).

Then, when the connection established in steps #775 and #611 is disconnected (steps #780 and #613), and reception of the file request data 5L becomes available, the timer 165 resumes measurement of time (step #781). For example, when a button to reset display is pressed, reception may be determined to be available and the reception may be resumed. Note that, at the time of resuming, a message may be displayed on the touch panel display 10e, or a beep sound may be sounded.

The user Uc performs, for the terminal device 2C and the image forming apparatus 1, an operation similar to the operation performed by the user Ub for the terminal device 2B and the image forming apparatus 1.

Figure 24:
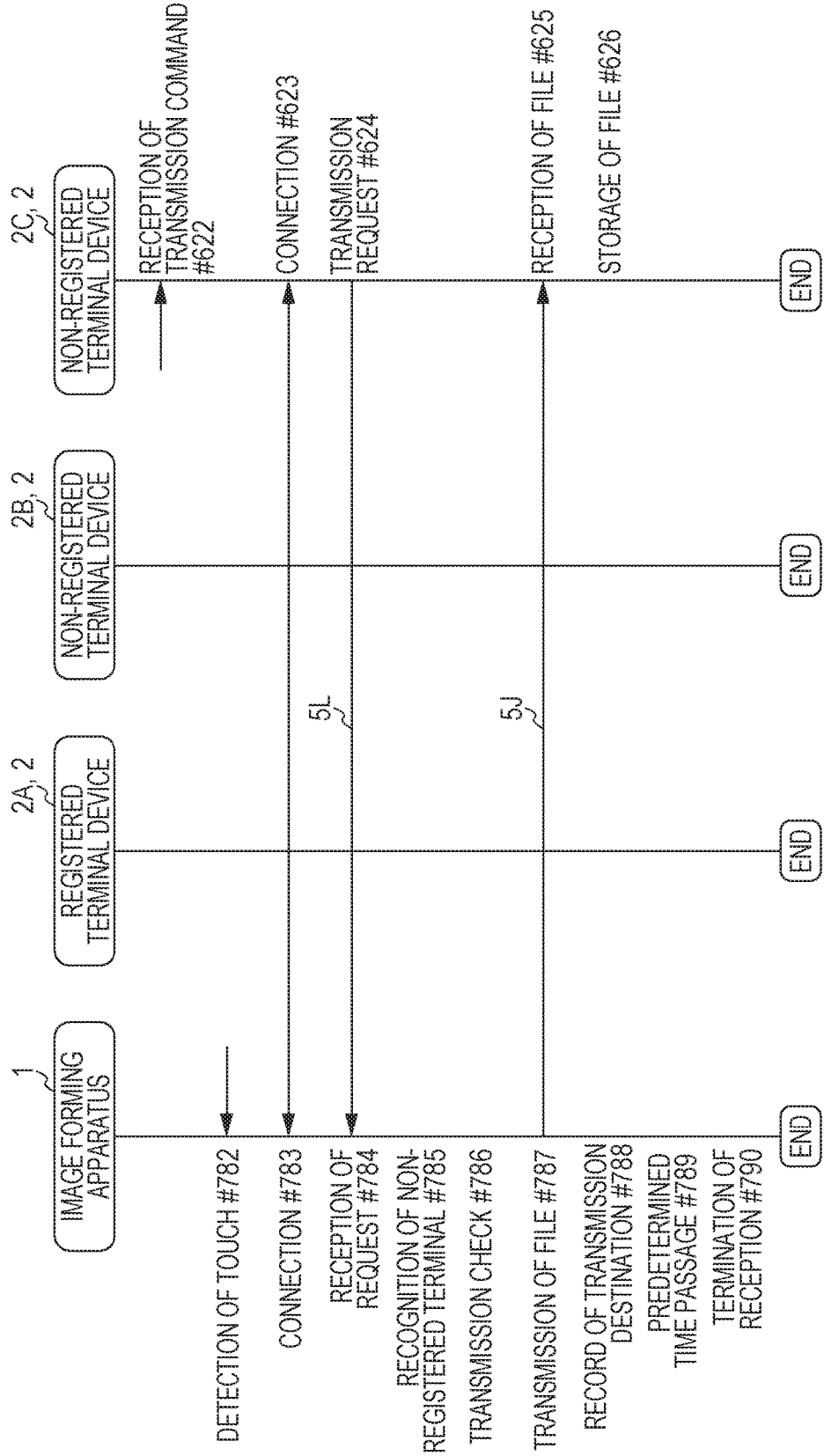
FIG. 24 is a sequence diagram illustrating an example of a flow of processing of devices of when three users perform a series of operations.

Then, the units of the terminal device 2C execute processing similar to steps #601 to #606 (steps #621 to #626 of FIG. 24).

Further, the units of the image forming apparatus 1 execute processing similar to steps #767 to #773 for the terminal device 2C, instead of the terminal device 2B (steps #782 to #788).

When the time measured by the timer 165 exceeds a predetermined time (step #789), the second mode switching unit 174 terminates the transmission request reception mode, and switches the mode to a provision suspension mode (step #790). Accordingly, provision of the target file 5J to the terminal device 2 of the non-registered user is terminated.

Figure 25:
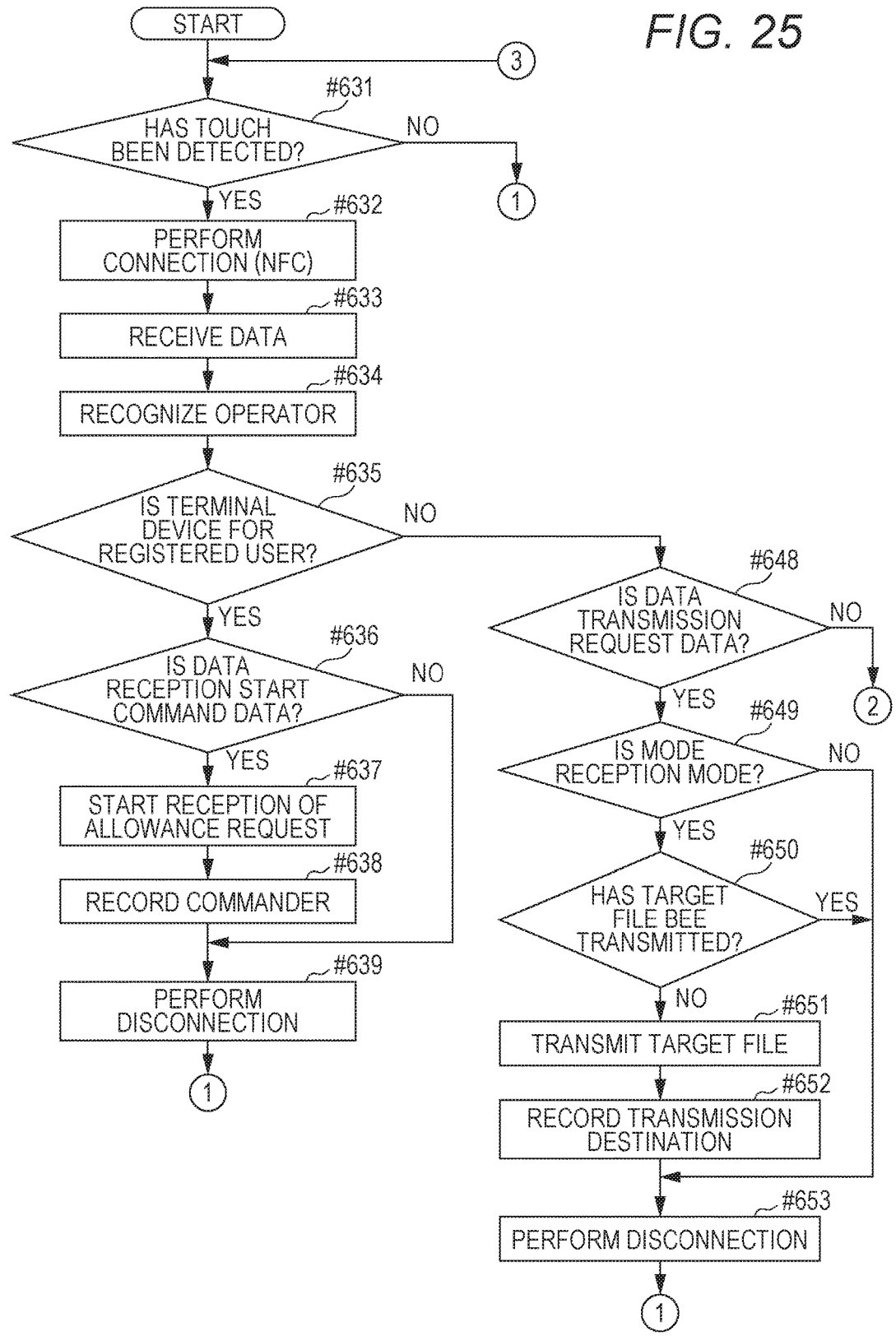
FIG. 25 is a flowchart for describing an example of a flow of overall processing of the image forming apparatus.
Figure 26:
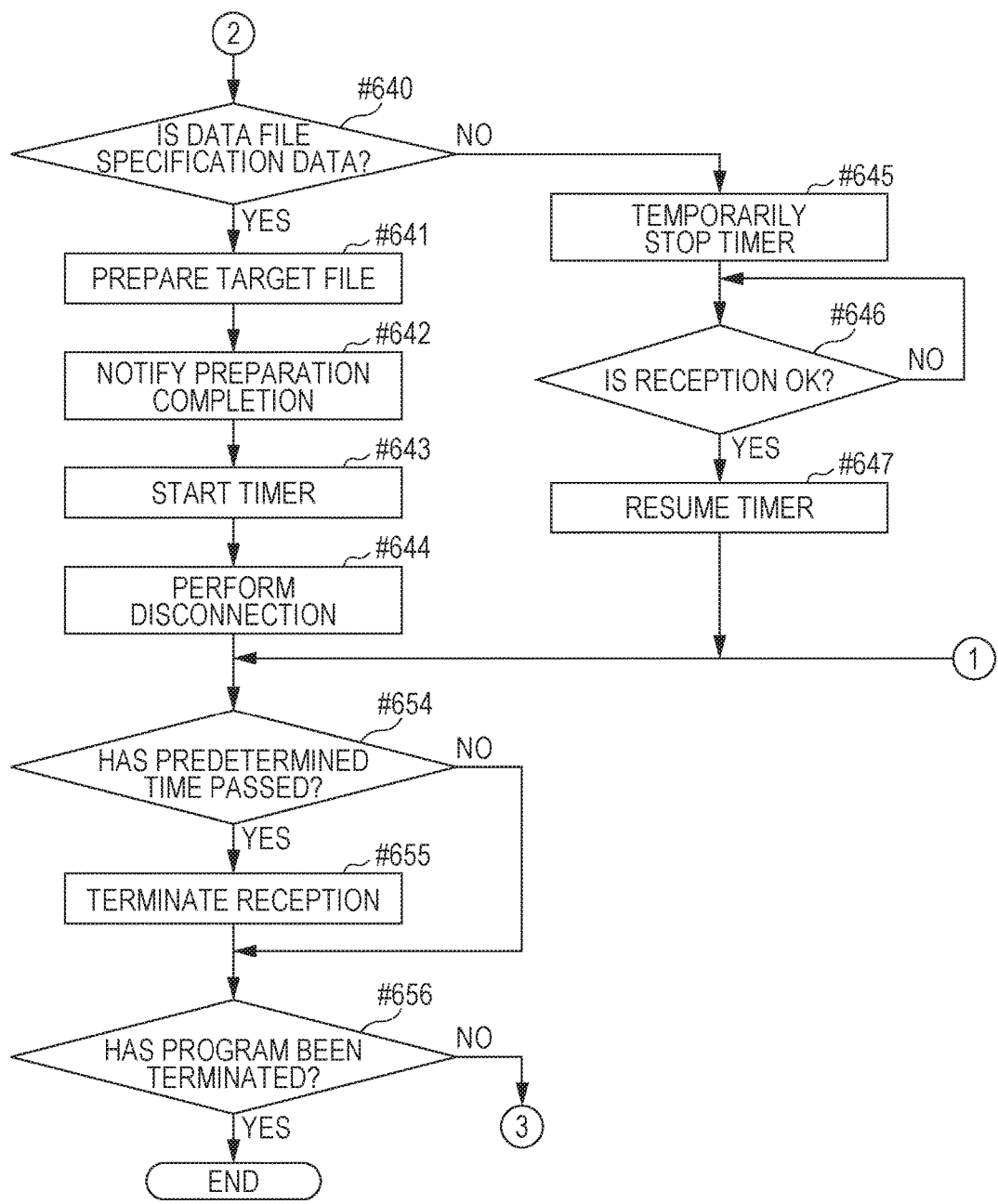
FIG. 26 is a flowchart for describing an example of a flow of overall processing of the image forming apparatus.
Figure 27:
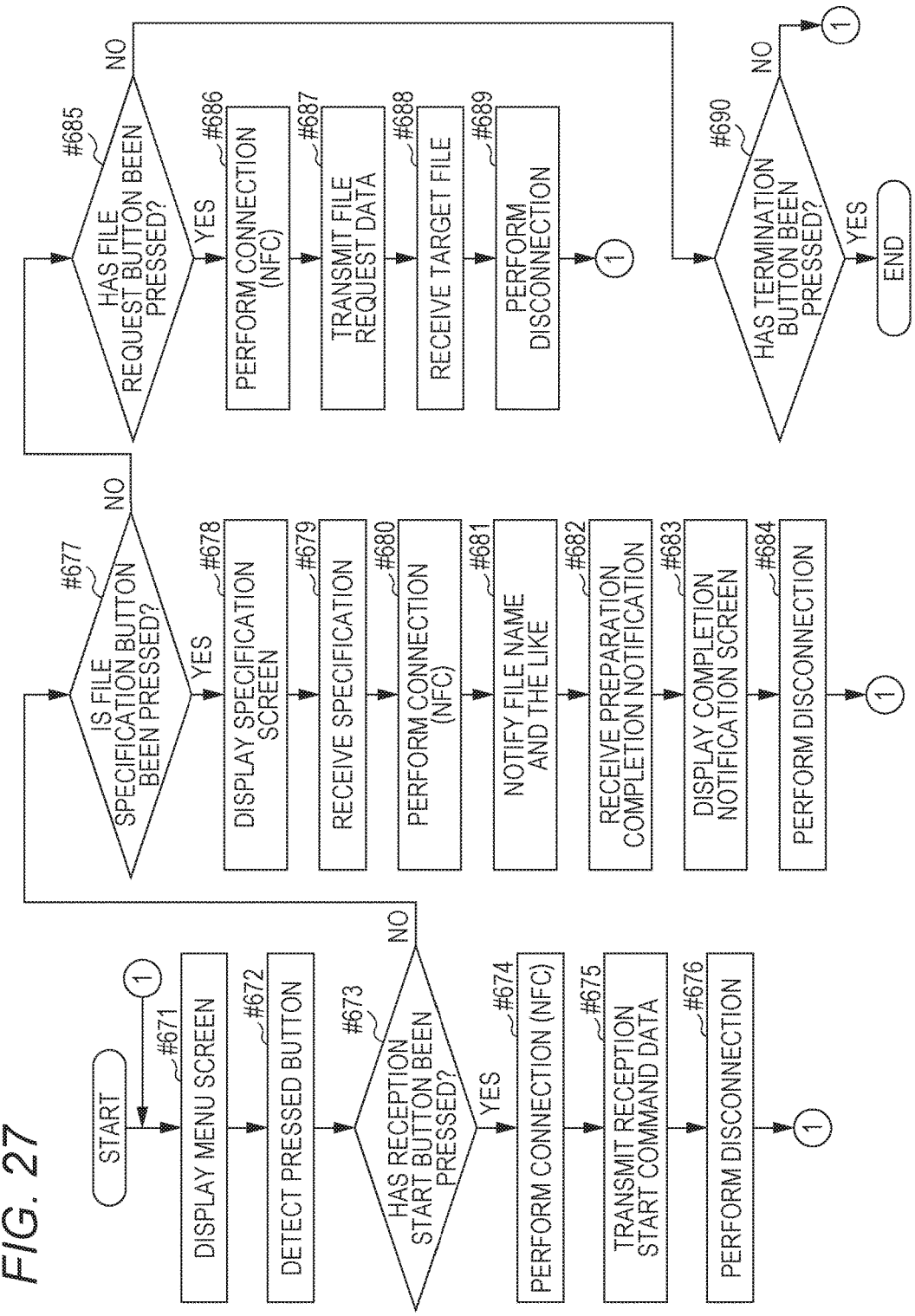
FIG. 27 is a flowchart for describing an example of a flow of overall processing of the terminal device.

FIGS. 25 and 26 are flowcharts for describing an example of a flow of overall processing of the image forming apparatus 1. FIG. 27 is a flowchart for describing an example of a flow of overall processing of the terminal device 2.

Next, respective flows of overall processing of the image forming apparatus 1 and the terminal device 2 will be described with reference to the flowcharts.

The image forming apparatus 1 executes processing in procedure illustrated in FIGS. 25 and 26 based on the server program 1P2.

When the image forming apparatus 1 has detected that the terminal device 2 comes close to or touches the image forming apparatus 1 (Yes in step #631 of FIG. 25), the image forming apparatus 1 establishes connection with the terminal device 2 by the short-distance wireless communication (step #632), and receives the data and the like from the terminal device 2 (step #633).

The image forming apparatus 1 recognizes whether the terminal device 2 is for the registered user or for the non-registered user based on a user code indicated in the data (step #634).

When the terminal device 2 is for the registered user (Yes in step #635), the image forming apparatus 1 performs processing as follows based on the data.

When this data is the reception start command data 5Q (Yes in step #636), the image forming apparatus 1 switches the mode to the transmission request reception mode, starts reception of the file request data 5L from the terminal device 2 of the non-registered user (step #637), and records the user code indicated in the reception start command data 5Q (step #638). Then, the image forming apparatus 1 disconnects the connection established in step #632 (step #639).

Further, when this data is the file specification data 5H (Yes in step #640 of FIG. 26), the image forming apparatus 1 reads a file specified in the file specification data 5H from a box, and stores the file to the target file storage unit 163 as the target file 5J (step #641). The image forming apparatus 1 notifies that preparation is completed by returning preparation completion data 5K to the terminal device 2 as the transmission source (step #642). Further, the timer 165 starts measurement of time that has passed since the provision of the target file 5J could have become available (step #643). Then, the image forming apparatus 1 disconnects the connection established in step #632 (step #644).

Further, when this data is neither the reception start command data 5Q nor file specification data 5H (No in step #636 and No in step #640), processing is performed based on a program other than the server program 1P2 and the data. For example, when image data and a print command are transmitted, printing is performed based on the image data.

The timer 165 is temporarily stopped while the file request data 5L cannot be received (step #645). Then, when the processing proceeds or is completed, the connection established in step #632 is disconnected, and the reception of the file request data 5L becomes available (Yes in step #646), time measurement by the timer 165 is resumed (step #647).

Meanwhile, when the terminal device 2 as the transmission source is for the non-registered user (No in step #635), and when the data received from the terminal device 2 is the file request data 5L (Yes in step #648), the present mode is the transmission request reception mode (Yes in step #649), and the target file 5J has not yet been transmitted to the terminal device 2 (No in step #650), the image forming apparatus 1 transmits the target file 5J to the terminal device 2 (step #651). Further, the image forming apparatus 1 records that the target file 5J has been transmitted to the terminal device 2 (step #652), and disconnects the connection established in step #632 (step #653).

When the time measured by the timer 165 exceeds a predetermined time (Yes in step #654), the image forming apparatus 1 terminates the transmission request reception mode, and puts the mode back to the provision suspension mode (step #655).

The image forming apparatus 1 appropriately executes the above-described processing until the server program 1P2 is terminated.

The terminal device 2 executes processing in the procedure illustrated in FIG. 27, based on the client program 2P2.

After startup of the client program 2P1, the terminal device 2 displays the menu screen 6Q (see FIG. 20) (step #671 of FIG. 27).

Here, the user presses one of the buttons on the menu screen 6Q. When the terminal device 2 has detected the pressed button (step #672), the terminal device 2 executes the next processing according to the button.

When the terminal device 2 has detected that the reception start button 6Qa has been pressed (Yes in step #673), the terminal device 2 establishes connection with the image forming apparatus 1 by the short-distance wireless communication (step #674), and transmits the reception start command data 5Q to the image forming apparatus 1 (step #675). After the transmission, the terminal device 2 disconnects the connection (step #676).

Alternatively, when the terminal device 2 has detected that the file specification button 6Qb (Yes in step #677), the terminal device 2 executes processing similarly to steps #52 to #58 (see FIG. 16) of the first embodiment (steps #678 to #684). Accordingly, the file to be provided is notified to the image forming apparatus 1.

Alternatively, when the terminal device 2 has detected that the file request button 6Qc has been pressed (Yes in step #685), the terminal device 2 establishes connection with the image forming apparatus 1 by the short-distance wireless communication (step #686), and transmits the file request data 5L to the image forming apparatus 1 (step #687). Then, when the terminal device 2 has received the target file 5J from the image forming apparatus 1 (step #688), the terminal device 2 disconnects the connection (step #689). Note that the terminal device 2 disconnects the connection when the terminal device 2 cannot receive the target file 5J even after the predetermined time has passed.

Further, when the terminal device 2 has detected that a termination button 6Qd has been pressed (Yes in step #690), the terminal device 2 terminates the processing by the client program 2P2.

According to the second embodiment, the processing for providing the file from the image forming apparatus 1 to the terminal device 2 of the non-registered user can be more easily performed than a conventional case while the security is constantly held. The transmission/reception of the file is performed by the short-distance wireless communication instead of the IP communication. Therefore, when the target file 5J is provided to a plurality of the terminal devices 2, a longer time is required than the first embodiment. However, a less number of operations of the user is required than the first embodiment.

Figure 28A:
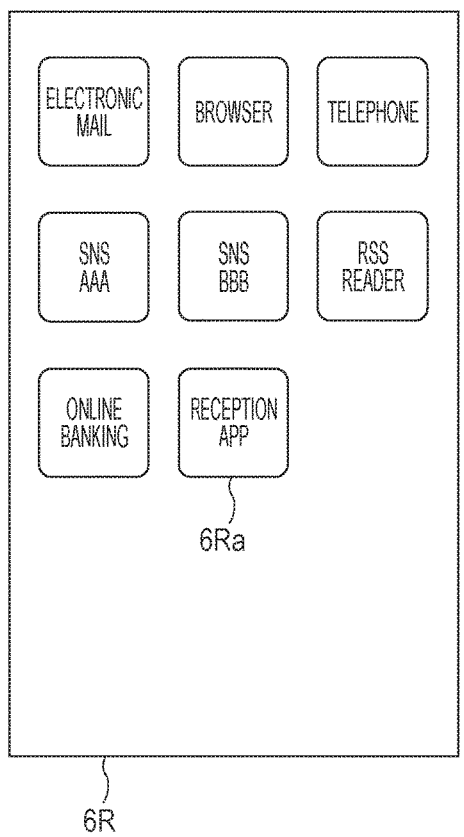
FIGS. 28A and 28B are diagrams illustrating examples of a home screen.
Figure 28B:
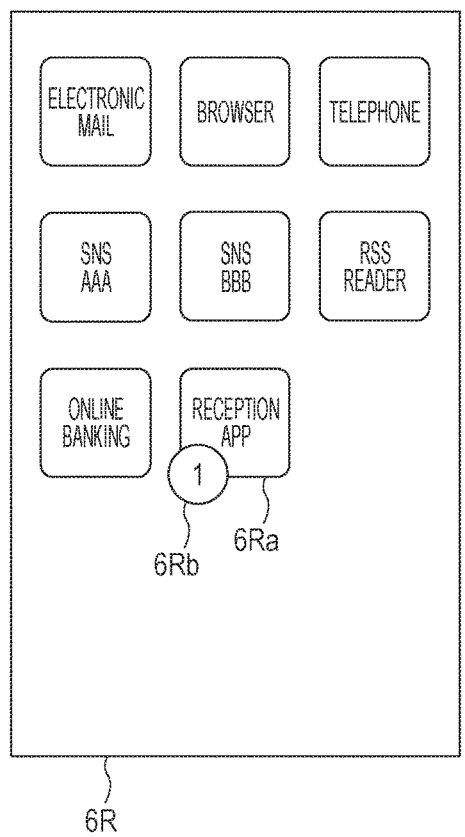
Figure 29:
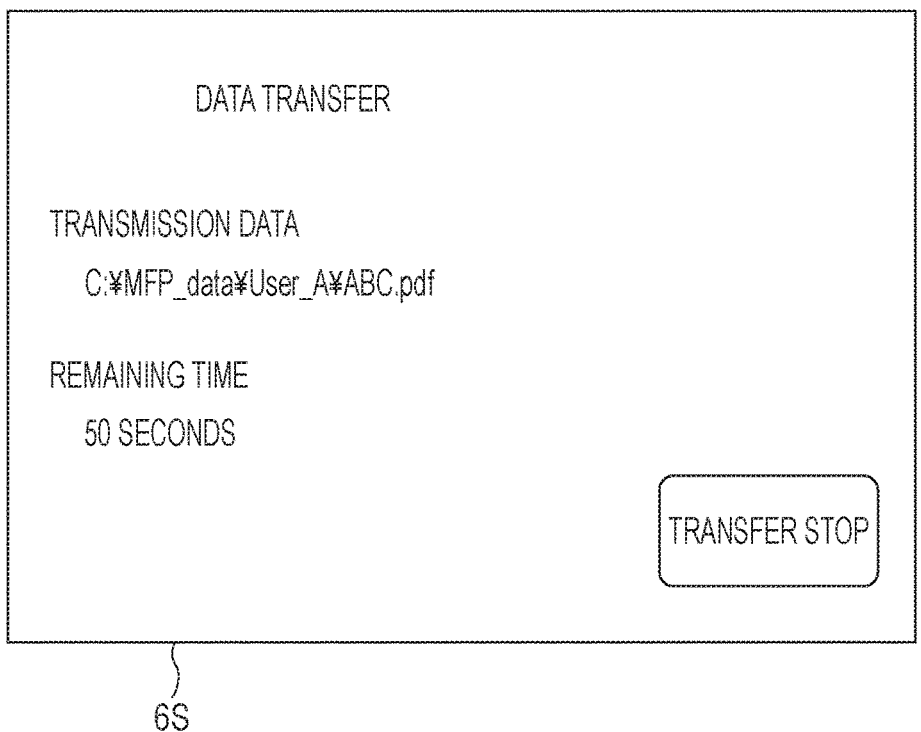
FIG. 29 is a diagram illustrating an example of a state notification screen.

FIGS. 28A and 28B are diagrams illustrating examples of a home screen 6R. FIG. 29 is a diagram illustrating an example of a state notification screen 6S.

In the first embodiment, the functions illustrated in FIG. 5 are realized by the client program 2P1. That is, the functions are realized by the program prepared for the terminal device 2 in advance. However, the file request unit 234, the file reception unit 235, and the file storage unit 236 may be realized by another program as follows, for example.

When the connection information providing unit 122 of the image forming apparatus 1 receives allowance command data 5E from the terminal device 2, the connection information providing unit 122 transmits a reception application to the terminal device 2 together with the connection data 5F. The reception application is an application for realizing the file request unit 234, the file reception unit 235, and the file storage unit 236.

The terminal device 2 downloads (receives) the reception application and installs the reception application. Then, as illustrated in FIG. 28A, the home screen 6R is displayed on the touch panel display 20e of the terminal device 2 with an icon 6Ra of the reception application added. When the user presses the icon 6Ra, the terminal device 2 starts the reception application, accesses the image forming apparatus 1 based on the reception application and the connection data 5F, and receives the target file 5J.

After downloading the reception application from the image forming apparatus 1, the terminal device 2 may automatically execute the reception application even if the icon 6Ra is not pressed. In this case, after receiving the target file 5J, the terminal device 2 may display a mark 6Rb that indicates that a new file has been received on the icon 6Ra as illustrated in FIG. 28B.

Note that, when the reception application has already been installed, the terminal device 2 may receive the target file 5J by the reception application. The terminal device 2 does not need to download and install the reception application again.

Similarly, in the second embodiment, the terminal device 2 may realize the file request unit 271, the file reception unit 272, and the file storage unit 273 illustrated in FIG. 19 by the reception application. In this case, when the image forming apparatus 1 has received the file request data 5L from the terminal device 2, the image forming apparatus 1 transmits the reception application to the terminal device 2. The terminal device 2 installs and starts the reception application. Then, the terminal device 2 receives the target file 5J from the image forming apparatus 1 by the reception application.

In the second embodiment, the target file 5J is transmitted from the image forming apparatus 1 to the terminal device 2 by the short-distance wireless communication. Therefore, the time to bring the terminal device 2 close to or into contact with the image forming apparatus 1 is longer than the first embodiment. Furthermore, the transmission takes longer time as the size of the target file 5J is larger.

Therefore, the image forming apparatus 1 may display a state notification screen 6S that shows a remaining time required for the transmission, as illustrated in FIG. 29, during the transmission of the target file 5J.

In the first embodiment, a specific character string (for example, a one-time password) may be indicated in the connection data 5F, in addition to the IP address or the MAC address of the image forming apparatus 1. The terminal device 2 generates the file request data 5L to include the character string, and transmits the file request data 5L to the image forming apparatus 1. The image forming apparatus 1 then transmits the target file 5J to the terminal device 2 if the character string is correctly indicated in the file request data 5L.

In the second embodiment, the image forming apparatus 1 terminates the provision of the target file 5J when the time measured by the timer 165 reaches a predetermined time. However, the image forming apparatus may terminate the provision when a command is given from the terminal device 2A.

In the first embodiment, the terminal device 2 has transmitted the reception start command data 5D and the file specification data 5H to the image forming apparatus 1 at different timing, as described in step #804 of FIG. 7 and step #814 of FIG. 9. However, the terminal device 2 may transmit both of the data at the same time. In this case, the image forming apparatus 1 and the terminal device 2 may be configured as follows, and the user may operate the terminal device 2 as follows.

The user presses the file specification button 6Ld before the reception start button 6La on the menu screen 6L (see FIG. 6). The terminal device 2 then displays the specification screen 6M (see FIG. 12). Here, the user specifies the target file 5J according to the above-described procedure, and presses an execution button 6Mc. Then, the terminal device 2 closes the specification screen 6M, and displays the menu screen 6L again.

Further, the user presses the reception start button 6La. Then, the user brings the terminal device 2 close to or into contact with the image forming apparatus 1.

Then, the image forming apparatus 1 and the terminal device 2 are connected, and the terminal device 2 transmits the reception start command data 5D and the file specification data 5H to the image forming apparatus 1.

In this case, the mode of the image forming apparatus 1 is transitioned as follows. When the image forming apparatus 1 receives the reception start command data 5D and the file specification data 5H, the image forming apparatus 1 switches the mode from the provision suspension mode to the desire reception mode. When the image forming apparatus 1 receives the reception termination command data 5G, the image forming apparatus 1 switches the mode from the desire reception mode to the transmission request reception mode without through the specification wait mode. Then, when a predetermined time has passed, the image forming apparatus 1 switches the mode from the transmission request reception mode to the provision suspension mode.

Further, the terminal device 2 may transmit the file specification data 5H to the image forming apparatus 1 at the same time as the reception termination command data 5G.

Similarly, in the second embodiment, the terminal device 2 may transmit the reception start command data 5Q and the file specification data 5H at the same time.

In the first embodiment, the terminal device 2 performs communication with the image forming apparatus 1 by the wireless LAN when receiving the target file 5J. However, the communication may be performed by Bluetooth if an interface of Bluetooth is included in the image forming apparatus 1.

In addition, the overall configurations, the configurations of the respective units, the processing content, the processing order, the configuration of the data, the configurations of the screens and the like of the data sharing system 4, the image forming apparatus 1, and the terminal device 2 can be appropriately changed according to the spirit of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   a first communication device configured to perform communication by a short-distance wireless method;
   a second communication device having a broader communication range than the first communication device;
   a storage unit configured to store data to which an access right of a first user is set; and
   a hardware processor configured to:
   receive, from a first terminal device of the first user via the first communication device, a data providing command for starting to provide the data stored in the storage to which the access right of the first user is set, to another user who does not have an access right to the stored data, and, upon receipt of the data providing command, switch a mode of the image forming apparatus from a provision suspension mode, which is a default mode in which provision of the stored data to another user who does not have an access right to the stored data is suspended, to a desire reception mode which is a mode to receive a request to provide the stored data to another terminal device of another user who does not have the access right to the stored data;
   receive, from a second terminal device of a second user via the first communication device, an access request to the data;
   in a case in which the access request to the data is received from the second terminal device of the second user via the first communication device in a state in which the image forming apparatus is set in the desire reception mode, transmit, to the second terminal device via the first communication device, connection information via the second communication device;
   receive, from the first terminal device via the first communication device, a reception termination command, and, upon receipt of the reception termination command, terminate the desire reception mode;
   receive, from the first terminal device via the first communication data, file specification data which specifies the data to which the first user has the access right and which is to be transmitted to another user who does not have the access right, and, upon receipt of the file specification data, prepare the data stored in the storage which is specified in the file specification data for transmission via the second communication device, and switch a mode of the imaging forming apparatus to a transmission request reception mode;

receive, via the second communication device, from the second terminal device to which the connection information was transmitted, a transmission request for the data, the transmission request being transmitted by and received from the second terminal device via the second communication device using the connection information;

in a case in which the transmission request is received from the second terminal device via the second communication device in a state in which the transmission request reception mode is set, transmit, to the second terminal device via the second communication device, the data stored in the storage which has been prepared for transmission and was specified in the file specification data; and switch the mode of the image forming apparatus to the provision suspension mode, after having transmitted the data to the second terminal device.

2. The image forming apparatus according to claim 1, wherein the first communication device performs communication by a proximity wireless communication method.

3. The image forming apparatus according to claim 1, wherein the hardware processor controls the first communication device so that the connection information is transmitted, when the access request is received after the data providing command is received.

4. The image forming apparatus according to claim 1, wherein the hardware processor controls the first communication device so that the connection information is transmitted, when the access request is received before expiration of a time limit, after the data providing command is received.

5. The image forming apparatus according to claim 1, wherein the hardware processor controls the first communication device to transmit the connection information when the access request is received by a time that the reception termination command is received by the first communication device from the first terminal device, after the data providing command is received.

6. The image forming apparatus according to claim 1, wherein:
a plurality of the data is stored in the storage unit, and
the hardware processor controls the second communication device so that the data which is indicated in the file specification data received by the first communication device from the first terminal device is transmitted to the second terminal device.

7. The image forming apparatus according to claim 1, wherein the second communication device performs communication by transmission control protocol/Internet protocol (TCP/IP).

8. A terminal device which is capable of communicating with an image forming apparatus which has a storage configured to store data to which an access right of a first user is set, the terminal device comprising:
a first communication device configured to perform communication by a short-distance wireless method;
a second communication device having a broader communication range than the first communication device; and
a hardware processor configured to:

transmit, to the image forming apparatus via the first communication device, an access request to the data to which the access right of the first user is set, wherein a user of the present terminal device does not have an access right to the stored data, receive, from the image forming apparatus via the first communication device, connection information for connecting to the image forming apparatus via the second communication device, wherein the image forming apparatus transmits the connection information to the present terminal device in a case in which the image forming apparatus receives the access request to the data from the present terminal device in a state in which the image forming apparatus has been set in a desire reception mode, which is a mode to receive a request to provide the stored data to a terminal device of a user who does not have the access right to the stored data, and wherein the image forming apparatus switches a mode thereof from a provision suspension mode, which is a default mode in which provision of the stored data to another user who does not have an access right to the stored data is suspended, to the desire reception mode, in a case in which the image forming apparatus receives, from a terminal device of the first user who has the access right to the stored data, a data providing command for starting to provide the data to another user who does not have an access right to the stored data;

transmit, to the image forming apparatus via the second communication device using the connection information, a transmission request for the data; and receive the data from the image forming apparatus via the second communication device, based on the connection information, wherein the image forming apparatus transmits the data to the present terminal device in a case in which the image forming apparatus receives the transmission request from the present terminal device in a state in which the image forming apparatus has been set in a transmission request reception mode and has prepared the data for transmission, wherein the image forming apparatus switches the mode thereof to the transmission request reception mode and prepares the data for transmission in a case in which the image forming apparatus receives, from the terminal device of the first user, file specification data which specifies the data to which the first user has the access right and which is to be transmitted to another user who does not have the access right, and wherein the image forming apparatus switches the mode thereof to the provision suspension mode after having transmitted the data to the present terminal device.

9. The terminal device according to claim 8, wherein the first communication device performs communication by a proximity wireless communication method.

10. A non-transitory recording medium storing a computer readable program used by an image forming apparatus including a first communication device that performs communication by a short-distance wireless method, a second communication device having a broader communication range than the first communication device, and a storage unit that stores data to which an access right of a first user is set, the computer program causing the image forming apparatus to execute processing comprising:
receiving, from a first terminal device of the first user via the first communication device, a data providing command for starting to provide the data stored in the storage to which the access right of the first user is set, to another user who does not have an access right to the stored data, and, upon receipt of the data providing command, switch a mode of the image forming apparatus from a provision suspension mode, which is a default mode in which provision of the stored data to another user who does not have an access right to the stored data is suspended, to a desire reception mode which is a mode to receive a request to provide the stored data to another terminal device of another user who does not have the access right to the stored data;

receiving, from a second terminal device of a second user via the first communication device, an access request to the data;

in a case in which the access request to the data is received from the second terminal device of the second user via the first communication device in a state in which the image forming apparatus is set in the desire reception mode, transmitting, to the second terminal device via the first communication device, connection information for connecting to the image forming apparatus via the second communication device;

receiving, from the first terminal device via the first communication device, a reception termination command, and, upon receipt of the reception termination command, terminating the desire reception mode;

receiving, from the first terminal device via the first communication data, file specification data which specifies the data to which the first user has the access right and which is to be transmitted to another user who does not have the access right, and, upon receipt of the file specification data, prepare the data stored in the storage which is specified in the file specification data for transmission via the second communication device, and switching a mode of the imaging forming apparatus to a transmission request reception mode;

receiving, via the second communication device, from the second terminal device to which the connection information was transmitted, a transmission request for the data, the transmission request being transmitted by and received from the second terminal device via the second communication device using the connection information;

in a case in which the transmission request is received from the second terminal device via the second communication device in a state in which the transmission request reception mode is set, transmitting, to the second terminal device via the second communication device, the data stored in the storage which has been prepared for transmission and was specified in the file specification data; and switching the mode of the image forming apparatus to the provision suspension mode, after having transmitted the data to the second terminal device.

11. The non-transitory recording medium storing a computer readable program according to claim 10, wherein the first communication device performs communication by a proximity wireless communication method.

* * * * *